(12) United States Patent
Aoki et al.

(10) Patent No.: US 11,874,976 B2
(45) Date of Patent: Jan. 16, 2024

(54) ELECTRONIC PEN AND ELECTRONIC PEN MAIN UNIT

(71) Applicant: Wacom Co., Ltd., Saitama (JP)

(72) Inventors: Shinya Aoki, Saitama (JP); Yoshiyuki Hashimoto, Saitama (JP); Takenori Kaneda, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 17/678,479

(22) Filed: Feb. 23, 2022

(65) Prior Publication Data

US 2022/0261098 A1  Aug. 18, 2022

Related U.S. Application Data

(63) Continuation of application No. PCT/JP2020/032978, filed on Sep. 1, 2020.

(30) Foreign Application Priority Data

Oct. 11, 2019  (JP) ................................. 2019-187507

(51) Int. Cl.
*G06F 3/038* (2013.01)
*G06F 3/0354* (2013.01)
(Continued)

(52) U.S. Cl.
CPC ........ *G06F 3/03546* (2013.01); *G06F 3/0383* (2013.01); *G06F 3/0441* (2019.05); *G06F 3/0442* (2019.05); *G06F 3/04162* (2019.05)

(58) Field of Classification Search
CPC .... G06F 3/038; G06F 3/03545; G06F 3/0441; G06F 3/0442; G06F 3/0383; G06F 3/03546; G06F 2203/0384
See application file for complete search history.

(56) References Cited

U.S. PATENT DOCUMENTS 5,750,939 A * 5/1998 Makinwa ............ G06F 3/03545
178/19.03
6,744,426 B1 * 6/2004 Okamoto ............ G06F 3/03545
345/174

(Continued)

FOREIGN PATENT DOCUMENTS

| EP | 3 764 202 A1 | 1/2021 |
|----|--------------|--------|
| JP | 2013-161307 A | 8/2013 |
| JP | 5687398 B1 | 3/2015 |

OTHER PUBLICATIONS

Extended European Search Report, dated Sep. 29, 2022, for European Application No. 20875171.9—1224 / 4012538, 8 pages.
(Continued)

*Primary Examiner* — Olga V Merkoulova
(74) *Attorney, Agent, or Firm* — Seed IP Law Group LLP

(57) ABSTRACT

In a case in which an electronic pen main unit made into a cartridge is held movably in a casing, electrical connections between the electronic pen main unit and electronic circuit components of the casing are reliably established. The electronic pen main unit is fitted to a fitting part disposed in a casing of an electronic pen in which the pen tip side is made to be an opening and is housed in a state of being movable in a hollow part of the casing by a movement mechanism that moves the fitting part in the axial center direction of the casing. The electronic pen main unit includes a pen tip part including an electrically-conductive core body allowed to protrude to the external through the opening by being moved by the movement mechanism, a main body tubular part to which the pen tip part is joined on the pen tip side in the axial center direction and that houses an electronic circuit including a signal generating circuit that generates a signal to be sent out to the external through the core body, and a rear-end-part connector that is disposed at a rear end part of the main body tubular part on the side (Continued)

opposite to the pen tip part in the axial center direction, includes a terminal connected to the electronic circuit, and is joined to a connector for joining disposed at the fitting part of the casing.

20 Claims, 11 Drawing Sheets

(51) Int. Cl.
*G06F 3/044* (2006.01)
*G06F 3/041* (2006.01)

(56) References Cited

U.S. PATENT DOCUMENTS

| | | | | |
|---|---|---|---|---|
| 8,913,041 | B2* | 12/2014 | Fukushima | G06F 3/046 345/179 |
| 10,845,900 | B2* | 11/2020 | Eguchi | G06F 3/044 |
| 2007/0025805 | A1* | 2/2007 | Lapstun | G06F 3/0321 401/195 |
| 2007/0195068 | A1* | 8/2007 | Kable | G06F 3/03545 345/179 |
| 2011/0193826 | A1* | 8/2011 | Liang | G06F 3/03545 345/179 |
| 2011/0219892 | A1* | 9/2011 | Fukushima | G06F 3/0416 73/865.4 |
| 2013/0199311 | A1* | 8/2013 | Horie | G06F 3/046 73/862.626 |
| 2017/0322643 | A1* | 11/2017 | Eguchi | G06F 3/04162 |
| 2018/0081458 | A1* | 3/2018 | Horie | G06F 3/0383 |
| 2019/0050072 | A1* | 2/2019 | Munakata | G06F 3/04162 |
| 2019/0310721 | A1* | 10/2019 | Eguchi | G06F 3/044 |

OTHER PUBLICATIONS

International Search Report, dated Nov. 17, 2020, for International Application No. PCT/JP2020/032978, 4 pages.

* cited by examiner

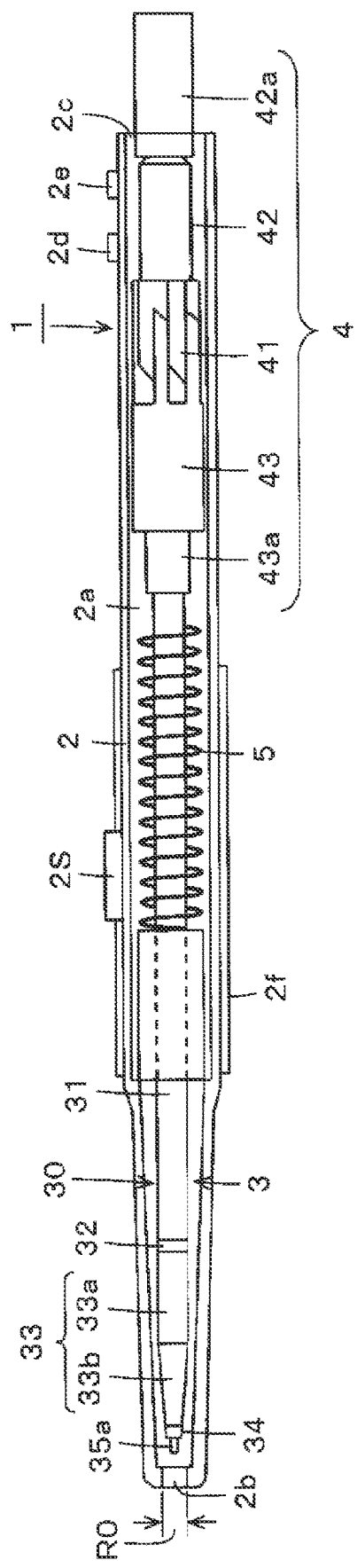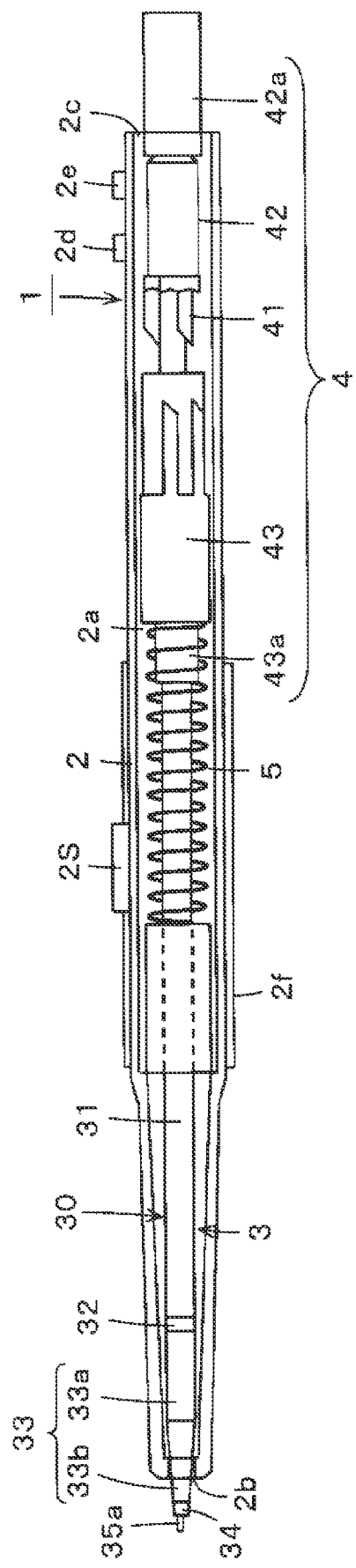

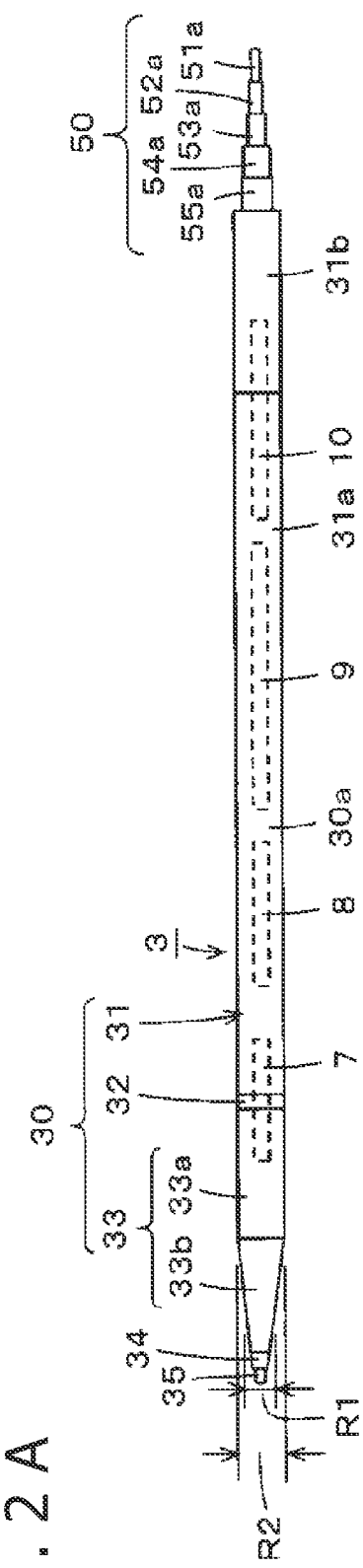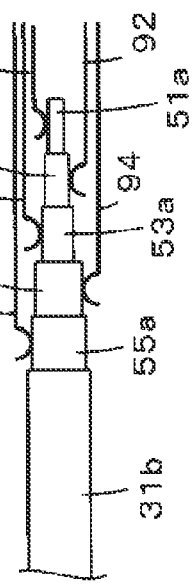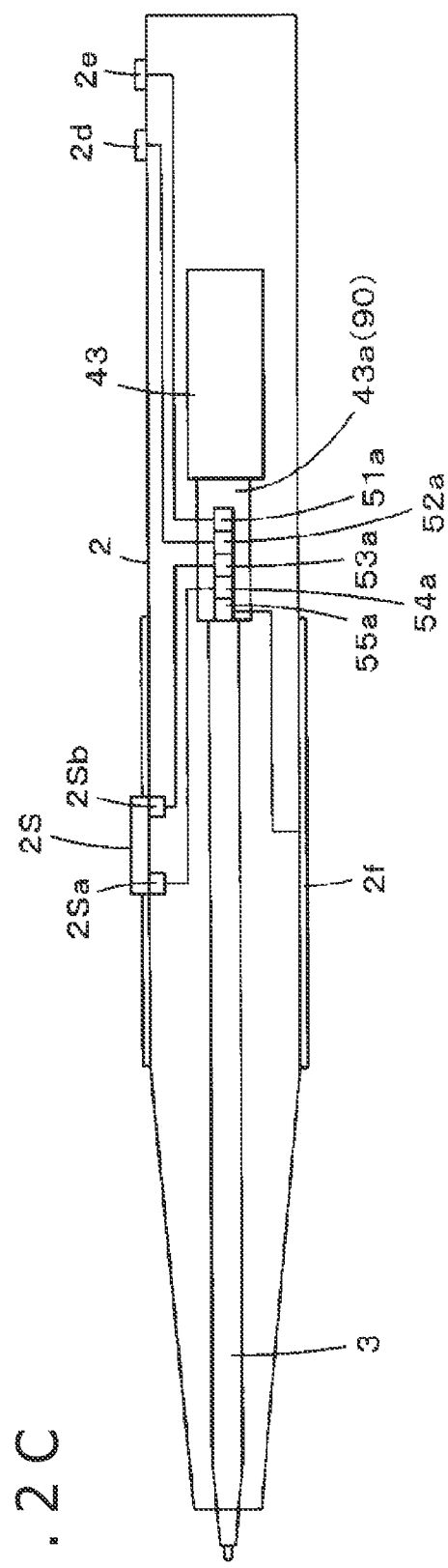

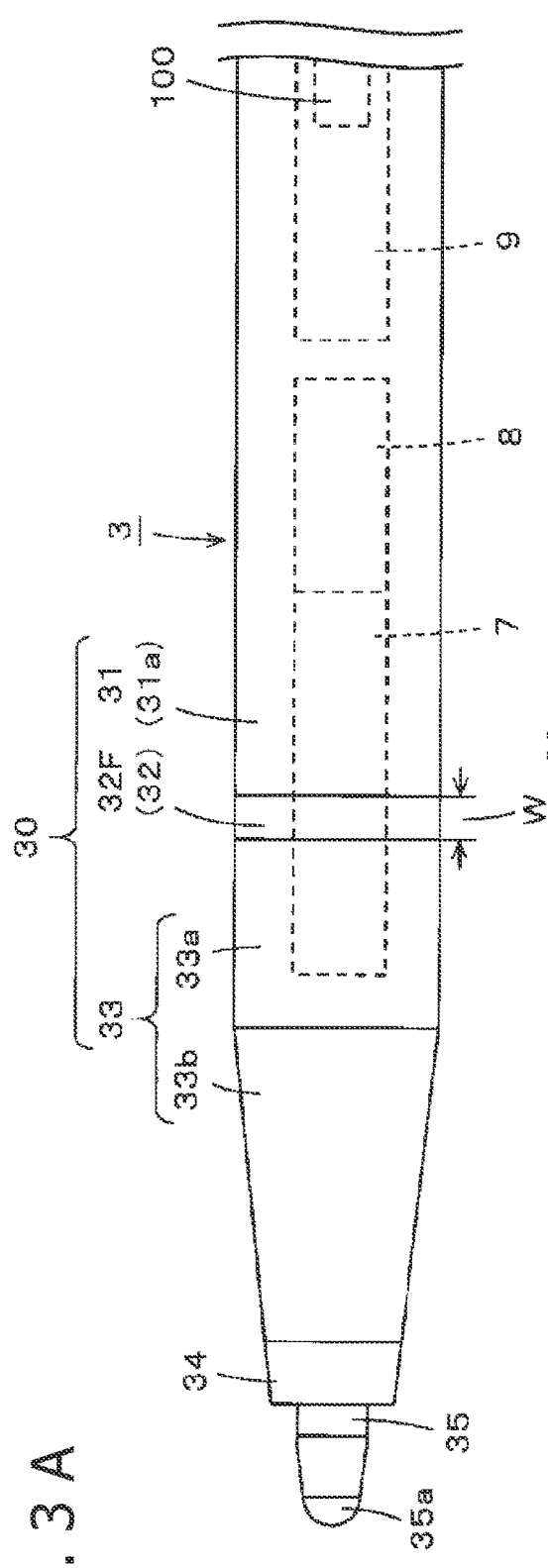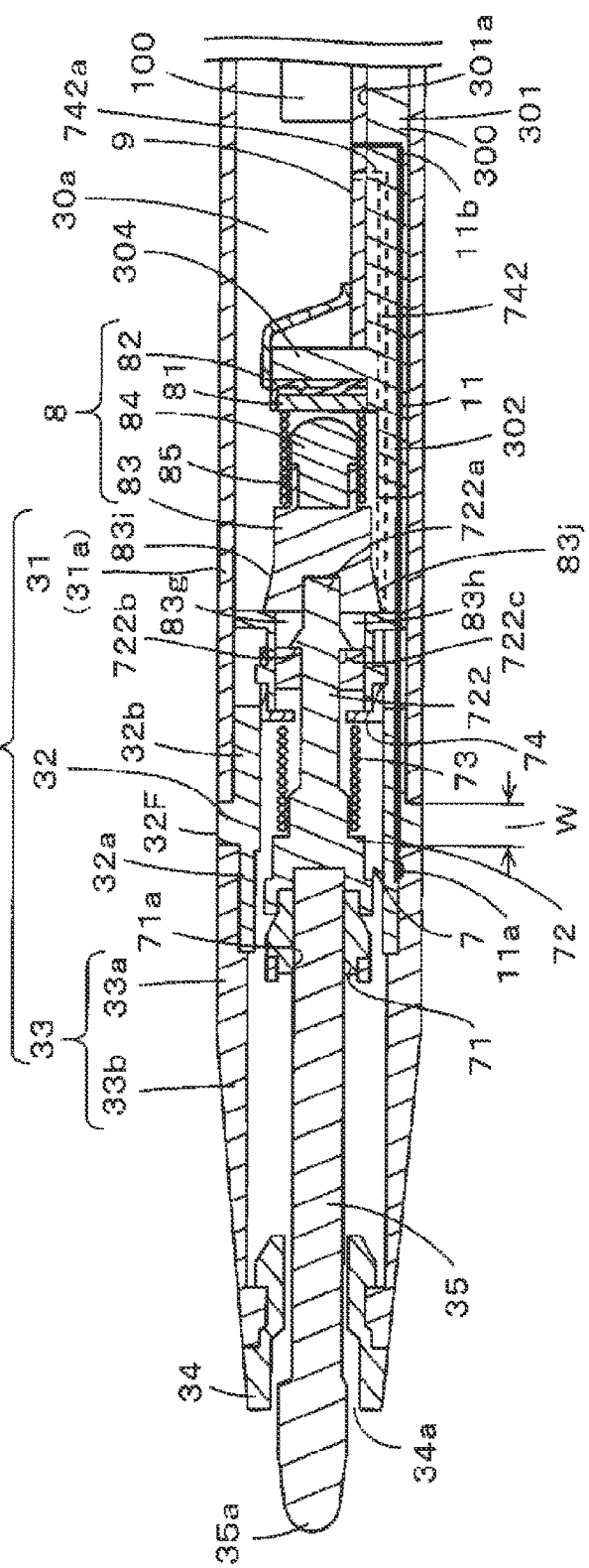

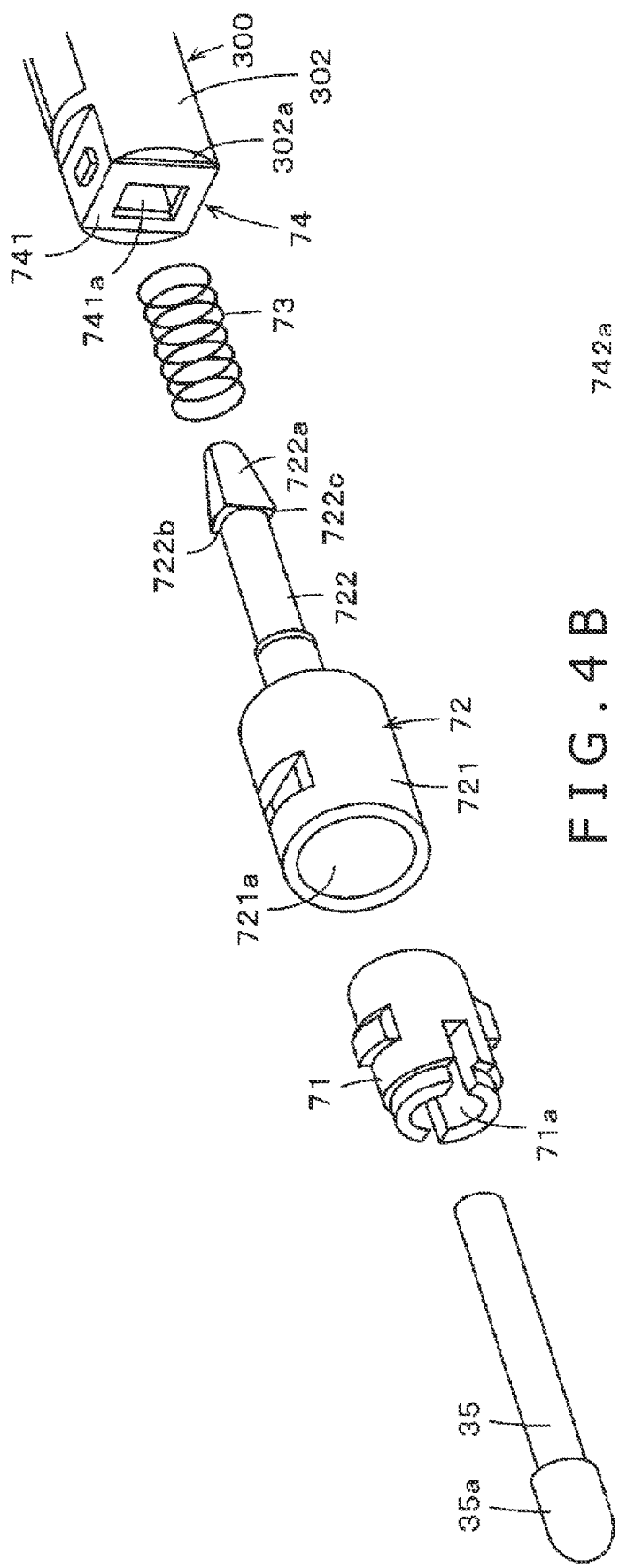

ELECTRONIC PEN AND ELECTRONIC PEN MAIN UNIT

BACKGROUND

Technical Field

This present disclosure relates to an electronic pen of a capacitive system that carries out transfer of signals with a position detecting sensor by electric field coupling and an electronic pen main unit.

Description of the Related Art

As an electronic pen of a capacitive system, an electronic pen of what is called an active capacitive system that carries out transfer of signals (interaction) through electric field coupling with a position detecting sensor of a position detecting device to allow detection of a position indicated by the electronic pen by the position detecting sensor has been favorably used.

In this kind of electronic pen of the active capacitive system, a power supply circuit and a signal transmitting circuit using a primary cell or secondary cell are incorporated. In addition, a core body is composed of a conductor, and the electronic pen transmits a signal from the signal transmitting circuit from the core body of the conductor to the position detecting sensor by capacitive coupling (for example, refer to Patent Document 1 (Japanese Patent No. 5687398)).

PRIOR ART DOCUMENT

Patent Document

Patent Document 1: Japanese Patent No. 5687398

BRIEF SUMMARY

Technical Problems

Incidentally, due to preference for size reduction in recent years, requests for size reduction have become stronger also regarding portable electronic equipment. Furthermore, the electronic pen has come to be used with a position detecting sensor mounted in this kind of small-size electronic equipment, and ones with a thinner shape have been desirable.

Moreover, recently, the electronic pen has been regarded as an extension of a writing material, and there has also been a demand for the internal configuration thereof to be modularized and be allowed to be treated similarly to a replacement core (refill or cartridge) of a ballpoint pen. Hereinafter, in this specification, what is configured to be replaceable like a replacement core of a ballpoint pen through modularization and integration of internal constituent parts of an electronic pen will be referred to as an electronic pen main unit.

In a case of attempting to configure the electronic pen of the active capacitive system with such an electronic pen main unit housed in the casing of the electronic pen, supply means of power to the signal transmitting circuit housed in the electronic pen main unit becomes a problem. That is, the electronic pen main unit in this case will have a very thin shape, and it is difficult to dispose a large-size primary cell in the electronic pen main unit. Even if it is possible to mount a primary cell in the electronic pen main unit, its battery capacity is small, requiring frequent replacement and causing unbearable troublesomeness. Thus, a rechargeable small-size power storage element or secondary cell should be disposed in the electronic pen main unit and be charged externally. However, how to carry out the charging is a problem.

Furthermore, in the electronic pen, there is also an electronic circuit component that should be disposed on the casing of the electronic pen in a state of being operable by a user, such as a side switch, and how to implement an electrical connection between the electronic circuit component and an electronic circuit of the electronic pen main unit is also a problem.

Moreover, in a case of configuring an electronic pen with use of such an electronic pen main unit, it is also important to protrude the tip part of the electronic pen main unit from an opening of the casing of the electronic pen to the external when the electronic pen is used similarly to, for example, a knock-type ballpoint pen, in order to protect the thin tip part. However, in a case in which the electronic pen main unit moves in the axial center direction in the casing of the electronic pen in that way, how to make an electrical connection between the electronic pen main unit like the above-described one and the electronic circuit component disposed on the casing of the electronic pen is a large problem.

This present disclosure provides an electronic pen and an electronic pen main unit that are enabled to solve the above problems.

Technical Solution

In order to solve the above-described problems, provided is an electronic pen main unit that is fitted to a fitting part disposed in a casing of an electronic pen in which a pen tip side that is one end side in an axial center direction is made to be an opening and is housed in a state of being movable in a hollow part of the casing by a movement mechanism that moves the fitting part in the axial center direction of the casing. The electronic pen main unit is characterized by including a pen tip part including an electrically-conductive core body allowed to protrude to external through the opening by being moved by the movement mechanism, a main body tubular part to which the pen tip part is joined on the pen tip side in the axial center direction and that houses an electronic circuit including a signal generating circuit that generates a signal to be sent out to the external through the core body, and a rear-end-part connector that is disposed at a rear end part of the main body tubular part on a side opposite to the pen tip part in the axial center direction, includes a terminal connected to the electronic circuit, and is joined to a connector for joining disposed at the fitting part of the casing.

Furthermore, provided is an electronic pen that has a tubular casing in which an opening is made on one end side in the axial center direction that is the pen tip side and in which at least one electronic pen main unit is housed in the tubular casing. The electronic pen is characterized by including a fitting part to which a rear end part side of the electronic pen main unit on the side opposite to the pen tip side is fitted, and a movement mechanism that moves the fitting part in the axial center direction of the casing, in which the fitting part includes a connector for joining including a terminal electrically connected to an electronic circuit component disposed on the casing, and the electronic pen main unit includes a pen tip part including an electrically-conductive core body allowed to protrude to the external through the opening through movement of the fitting part by the movement mechanism, a main body tubular part to which the pen tip part is joined on the pen tip side in the axial center direction and that houses an electronic circuit including a signal generating circuit that generates a signal to be sent out to the external through the core body, and a rear-end-part connector that is disposed at a rear end part of the main body tubular part on the side opposite to the pen tip part in the axial center direction, includes a terminal connected to the electronic circuit, and is joined to the connector for joining at the fitting part of the casing.

The electronic pen main unit with the above-described configuration is fitted to the fitting part that moves by the movement mechanism of the electronic pen and moves in the axial center direction in the hollow part of the casing of the electronic pen, and the pen tip part thereof is configured to be capable of protruding to the external from the opening of the casing.

Furthermore, the rear-end-part connector connected to the electronic circuit disposed inside the electronic pen main unit is disposed at the rear end part of the electronic pen main unit on the side opposite to the pen tip side. Moreover, at the fitting part of the casing of the electronic pen, the connector for joining to which electronic circuit components such as an electrode for charging and a side switch disposed on the casing of the electronic pen are connected is disposed.

Therefore, the rear-end-part connector and the connector for joining are joined when the rear end part of the electronic pen main unit is fitted to the fitting part of the casing of the electronic pen. Due to this, for example, a charging current supplied from the external to the electrode for charging is supplied to a power storage element included in the electronic circuit disposed inside the electronic pen main unit through the connector for joining and the rear-end-part connector, and the power storage element is charged. Furthermore, for example, a terminal of the side switch is connected to the electronic circuit disposed inside the electronic pen main unit through the connector for joining and the rear-end-part connector. This allows the electronic circuit to recognize a state of the side switch.

In the above-described configuration, the connector for joining is disposed at the fitting part moved by the movement mechanism, and the rear-end-part connector is disposed at the rear end part of the electronic pen main unit fitted to this fitting part. Therefore, the electronic pen main unit has a characteristic that the electrical connection is always secured even when the electronic pen main unit moves in the axial center direction in the casing of the electronic pen.

BRIEF DESCRIPTION OF THE SEVERAL VIEWS OF THE DRAWINGS

FIGS. 1A and 1B depict diagrams for explaining a configuration example of a first embodiment of an electronic pen according to an embodiment disclosed herein.

FIGS. 2A, 2B, and 2C depict diagrams for explaining a configuration example of the first embodiment of an electronic pen main unit according to an embodiment disclosed herein.

FIGS. 3A and 3B depict diagrams for explaining a configuration example of the pen tip side of the first embodiment of the electronic pen main unit according to an embodiment disclosed herein.

FIGS. 4A and 4B depict diagrams for explaining a configuration example of the first embodiment of the electronic pen main unit according to an embodiment disclosed herein.

DETAILED DESCRIPTION

Figure 5:
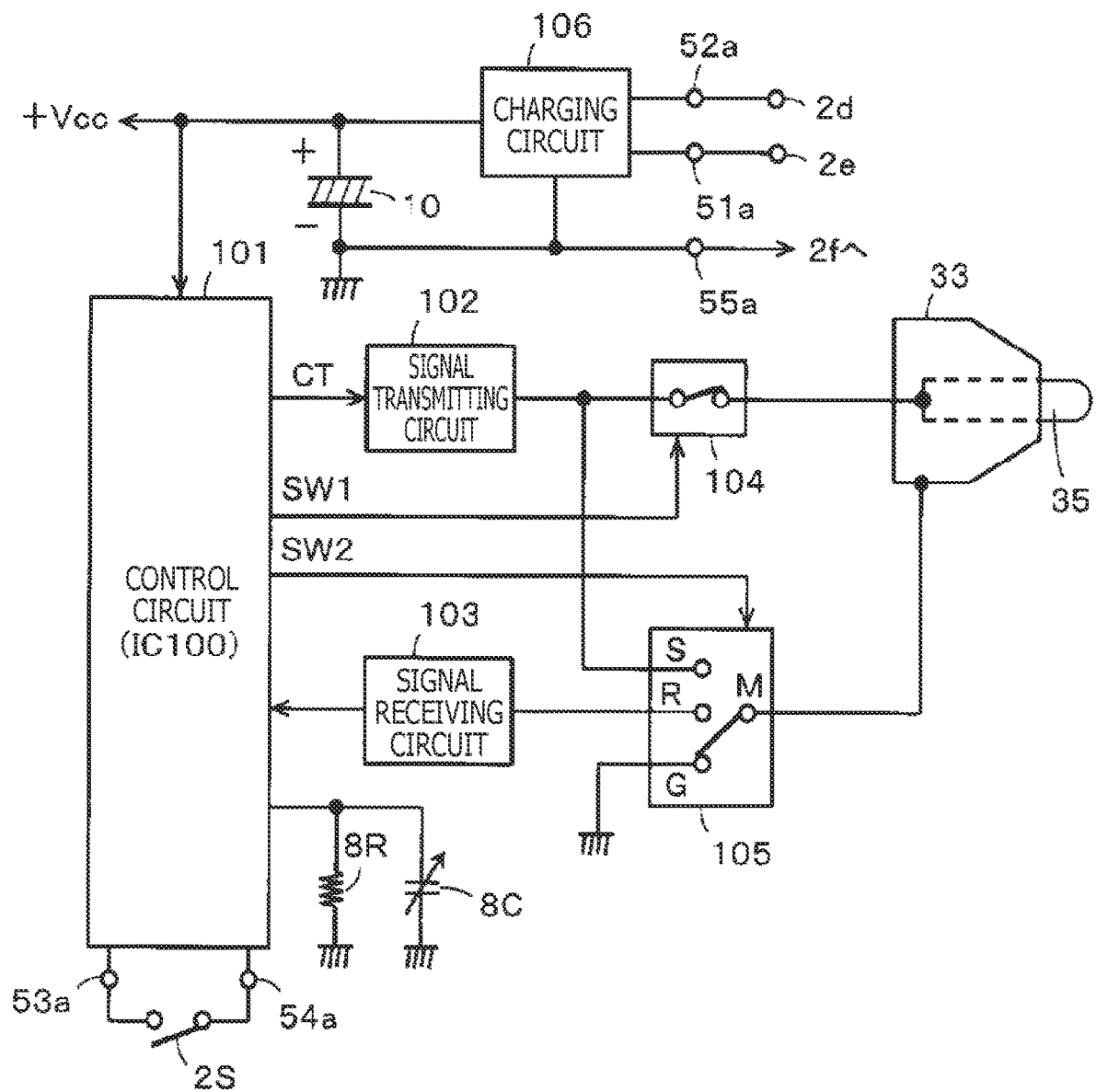
FIG. 5 is a block diagram for explaining a configuration example of an electronic circuit of the first embodiment of the electronic pen main unit according to an embodiment disclosed herein.

Embodiments of the electronic pen and the electronic pen main unit according to the present disclosure will be described below with reference to the drawings.

First Embodiment

An electronic pen of a first embodiment has a configuration in which an electronic pen main unit made to have a configuration of a cartridge type is housed in a tubular casing of the electronic pen attachably and detachably.

Incidentally, in electronic pens of the active capacitive system of recent years, an electronic pen of a bidirectional communication type that receives a signal from the side of a position detecting sensor that detects a position indicated by the electronic pen and transmits a signal of a format based on a request of the received signal has also been developed.

In this kind of electronic pen of the bidirectional communication type, the position of a receiving part for receiving the signal from the position detecting sensor is important. In a case of an electronic pen of the capacitive system, the signal transmitted from the position detecting sensor is what is based on an electric field that can be received by capacitive coupling, and the reaching distance of the signal is very short. Thus, the receiving part of the electronic pen of the bidirectional communication type should be disposed at a position close to the pen tip so that the signal from the position detecting sensor can be received with high intensity.

Thus, in the electronic pen of this embodiment, the configuration of the electronic pen main unit is considered to become the optimum configuration as one for the above-described electronic pen of the bidirectional communication type. Specifically, in the embodiment to be described below, a receiving part of a signal from a position detecting sensor is disposed in the electronic pen main unit. This receiving part includes a peripheral electrode composed of a tubular conductor disposed to surround a center electrode in such a manner as to cover the center electrode to the vicinity of the tip part of the center electrode while electrical insulation from the center electrode composed of an electrically-conductive material is taken into consideration.

Furthermore, recently, a technique has been proposed in which the tilt angle with respect to the position detecting sensor surface regarding the electronic pen (angle formed by the axial center direction of the electronic pen and the position detecting sensor surface; hereinafter abbreviated as a tilt angle of the electronic pen) is detected by a position detecting device and the detected tilt angle is reflected in the thickness of an indication locus (writing trace) of the electronic pen, and so forth. In the electronic pen main unit of the electronic pen of this embodiment, the above-described peripheral electrode is configured to be usable also for detection of a tilt angle of this electronic pen.

Furthermore, in this first embodiment, the peripheral electrode is configured to also play a role as a shield electrode for the center electrode that sends out a signal for position detection.

FIGS. 1A and 1B depict diagrams illustrating configuration examples of the first embodiment of the electronic pen according to an embodiment disclosed herein. An electronic pen 1 of this first embodiment has a configuration of a knock system in which an electronic pen main unit 3 is housed in a hollow part 2a of a tubular casing 2 (hereinafter, referred to as a pen casing 2) and the pen tip side of the electronic pen main unit 3 is caused to protrude and retract from the side of an opening 2b with a diameter R0 on one end side of the pen casing 2 in the longitudinal direction by a knock cam mechanism unit 4 as an example of the movement mechanism.

FIG. 1A illustrates the state in which the whole of the electronic pen main unit 3 is housed in the hollow part 2a of the pen casing 2, and FIG. 1B illustrates the state in which the pen tip side of the electronic pen main unit 3 protrudes from the opening 2b of the pen casing 2 due to the knock cam mechanism unit 4. In the example of FIGS. 1A and 1B, the pen casing 2 of the electronic pen 1 is composed of a transparent synthetic resin and is illustrated to be in the state in which the inside thereof is visible in a see-through manner.

In this embodiment, the pen casing 2 and the knock cam mechanism unit 4 disposed in the pen casing 2 are configured similarly to a knock-type ballpoint pen.

As illustrated in FIGS. 1A and 1B, the knock cam mechanism unit 4 has a configuration in which a cam main body 41, a knock bar 42, and a rotor 43 are combined. The cam main body 41 is formed on the inner wall surface of the tubular pen casing 2. In the knock bar 42, an end part 42a is allowed to protrude from an opening 2c of the pen casing 2 on the side opposite to the pen tip side so that knock operation by the user can be accepted. The rotor 43 has a fitting part 43a to which the rear end part of the electronic pen main unit 3 on the side opposite to the pen tip side is fitted.

However, the fitting part 43a is different from the fitting part of the casing of the knock-type ballpoint pen of a normal writing material in that a configuration of an electrical connection with the electronic pen main unit 3 is added to the fitting part 43a. Specifically, as described later, the electronic pen main unit 3 internally includes a signal transmitting circuit that generates a signal to be sent out to the position detecting sensor through the center electrode or the peripheral electrode, and a supply voltage is provided to the signal transmitting circuit.

In this embodiment, as described later, the signal transmitting circuit and a power storage element that supplies power to the signal transmitting circuit are disposed inside the electronic pen main unit 3. Furthermore, the power storage element is charged from the external of the electronic pen main unit 3. Thus, a terminal conductor (electrode) connected to the power storage element is disposed at the end part fitted to the fitting part 43a in the electronic pen main unit 3 of this embodiment, and a conductor connected to the terminal conductor connected to the power storage element is formed at the fitting part 43a. The electrical configuration is added to the configuration of the joined part to the electronic pen main unit 3, and the configuration of this joined part still remains a configuration to which a replacement core of a ballpoint pen is joined and mounted. A configuration example of the end part fitted to the fitting part 43a in the electronic pen main unit 3 will be described later together with a configuration example of the fitting part 43a.

Furthermore, at a part of the outer circumferential side surface on the side opposite to the pen tip side, in this example, in the pen casing 2, electrodes 2d and 2e for charging connected to a conductor disposed at the fitting part 43a are formed as illustrated in FIGS. 1A and 1B.

Moreover, a side switch 2S is disposed at a position on the outer circumferential side surface at which operation is allowed when the user uses the electronic pen 1 in the pen casing 2. The side switch 2S has a configuration of, for example, a push button switch or slide switch.

In the electronic pen 1 of this first embodiment, operation information of the side switch 2S is transmitted to the electronic pen main unit 3 through the fitting part 43a. The electronic pen main unit 3 of this first embodiment sends out this operation information of the side switch 2S to the position detecting device in addition to the signal for position detection and writing pressure information. Functions corresponding to this operation information of the side switch 2S are set in the position detecting device, and the position detecting device executes processing according to the set functions in accordance with the operation information of the side switch 2S received from the electronic pen main unit 3.

Furthermore, in this embodiment, a conductor band 2f is disposed at a position on the outer circumferential side surface grasped by the user at the time of use in the pen casing 2. This conductor band 2f is what is formed of a tubular body composed of an electrically-conductive material such as electrically-conductive rubber, for example, and is disposed to cover a partial outer circumference of the pen casing 2 in the axial center direction. In this first embodiment, the conductor band 2f is configured to be connected to an earth electrode of the electronic pen main unit 3 through the fitting part 43a. The user grasps the part of this conductor band 2f at the time of use. Due to this, the conductor band 2f and the earth electrode of the electronic pen main unit 3 connected thereto (metal pipe part 31a of a main body tubular part 31 to be described later is also connected) are connected to the ground (grounded) through the human body of the user.

In the electronic pen 1 with the above configuration, when the end part 42a of the knock bar 42 is pressed down in the state of FIG. 1A, the electronic pen main unit 3 is locked to the state of FIG. 1B in the pen casing 2 by the knock cam mechanism unit 4, which makes the state in which the pen tip side of the electronic pen main unit 3 protrudes from the opening 2b of the pen casing 2. Then, when the end part 42a of the knock bar 42 is pressed down again from this state of FIG. 1B, the locked state is released by the knock cam mechanism unit 4, and the position of the electronic pen main unit 3 in the pen casing 2 returns to the state of FIG. 1A by a spring 5 for return.

Embodiment of Electronic Pen Main Unit 3

FIG. 2A is a diagram illustrating an appearance configuration example of the electronic pen main unit 3 of this embodiment. Furthermore, FIG. 2B illustrates an electrical connection example at the joining part between the electronic pen main unit 3 of this embodiment and the fitting part 43a of the casing 2 of the electronic pen 1. Furthermore, FIG. 2C is a diagram schematically illustrating the state in which the electronic circuit inside the electronic pen main unit 3 and electronic circuit components disposed on the pen casing 2 of the electronic pen 1 are electrically connected when the electronic pen main unit 3 is fitted to the fitting part 43a.

The electronic pen main unit 3 of the electronic pen 1 of the first embodiment is made to have a configuration that can establish compatibility with a replacement core of a ballpoint pen except the configuration of the rear end side fitted to the fitting part 43a of the pen casing 2. FIGS. 3A and 3B depicts diagrams illustrating a configuration example of the pen tip side of the electronic pen main unit 3 of this embodiment, FIG. 3A is a diagram illustrating the appearance thereof, and FIG. 3B is a longitudinal sectional view thereof. Furthermore, FIG. 4A depicts an exploded perspective view for explaining a configuration example of the pen tip side of the electronic pen main unit 3 of this embodiment, illustrated in FIGS. 3A and 3B.

In the electronic pen main unit 3 of this embodiment, as illustrated in FIGS. 2A, 3A, and 3B, a peripheral electrode 33 composed of an electrically-conductive component, for example, an electrically-conductive metal, is joined to the pen tip side of the main body tubular part 31 with the interposition of a tubular joining component 32, so that a casing 30 (hereinafter, referred to as a main unit casing 30) of the electronic pen main unit 3 is configured.

In this example, as illustrated in FIG. 2A, the main body tubular part 31 is configured through joining of a resin pipe part 31b to the rear end side of the metal pipe part 31a on the side opposite to the pen tip side. Furthermore, in this example, for the main body tubular part 31, the peripheral electrode 33 is joined to the pen tip side of the metal pipe part 31a with the interposition of the tubular joining component 32. The tubular joining component 32 also plays a role in electrical insulation between the metal pipe part 31a and the peripheral electrode 33. Moreover, at the rear end part of the resin pipe part 31b, a rear-end-part connector fitted to the fitting part 43a disposed in the pen casing 2 of the electronic pen 1, a connector plug 50 in this example, is disposed. Meanwhile, at the fitting part 43a of the pen casing 2, a joining connector joined to the rear-end-part connector of the electronic pen main unit 3, a connector jack 90 in this example, is disposed.

In a hollow part 30a of the main unit casing 30, as illustrated by dotted lines in FIG. 2A and FIG. 3A, a core body holding component 7, a writing pressure detecting unit 8, a printed board 9 on which the signal transmitting circuit is mounted, and a rechargeable capacitor 10 as an example of the power storage element for supply voltage provision are disposed in such a manner as to be lined up in the axial center direction and be housed sequentially from the pen tip side.

This connector plug 50 includes multiple terminal parts, in this example, five terminal parts 51a, 52a, 53a, 54a, and 55a, that are electrically connected to the capacitor 10 housed in the electronic pen main unit 3 and the electronic circuit formed on the printed board 9, and are electrically insulated from each other.

In the electronic pen main unit 3 of this embodiment, the five terminal parts 51a, 52a, 53a, 54a, and 55a of the connector plug 50 are configured as follows. Specifically, in this example, the terminal part 51a is composed of a conductor metal that configures a core bar at the center. Furthermore, in the example of FIG. 2A, the connector plug 50 is configured through combining of the terminal parts 52a, 53a, 54a, and 55a that each have an inner wall surface on which an insulating layer is formed and have a cylindrical shape with the bar-shaped conductor metal of this terminal part 51a in a concentric manner.

In this case, the terminal part 51a of the conductor metal that configures the core bar at the center is set as the tip part in the axial center direction and its annular circumferential surface and tip are made to be exposed for a predetermined length in the axial center direction. In addition, in each of the cylindrical terminal parts 52a, 53a, 54a, and 55a, its annular circumferential surface is made to be exposed for a predetermined length in the axial center direction. That is, the five terminal parts 51a, 52a, 53a, 54a, and 55a of the connector plug 50 are in the state in which circular annular conductor contact parts are exposed at different positions in the axial center direction. The terminal part 51a has a circular column shape and its annular circumferential side surface and tip part configure the conductor contact part.

When this connector plug 50 is inserted into a fitting recess of the connector jack 90 that configures the connector for joining formed at the fitting part 43a made on the rotor 43 disposed in the hollow part of the pen casing 2 of the electronic pen 1, as illustrated in FIG. 2B, the connector plug 50 enters the state of being elastically connected to each of five contact terminals 91, 92, 93, 94, and 95 disposed in the connector jack 90. Each of the five contact terminals 91, 92, 93, 94, and 95 is composed of an electrically-conductive elastic metal and is electrically connected to a respective one of the electrodes 2d and 2e for charging, the side switch 2S, and the conductor band 2f that are disposed on the pen casing 2 (see FIG. 2C).

Therefore, through the insertion and joining of the connector plug 50 into the connector jack 90, electronic circuit components inside the electronic pen main unit 3 and electronic circuit components disposed on the pen casing 2 of the electronic pen 1 are electrically connected.

As illustrated in FIG. 2C, in this embodiment, the terminal parts 51a, 52a, 53a, 54a, and 55a of the connector plug 50 are each electrically connected to a respective one of the electrodes 2e and 2d for charging, both ends 2Sa and 2Sb of the side switch 2S, and the conductor band 2f through the five contact terminals 91, 92, 93, 94, and 95 disposed in the connector jack 90 (diagrammatic representation of the contact terminals of the connector jack 90 is omitted in FIG. 2C).

At this time, the circular annular conductor contact parts of the terminal parts 51a, 52a, 53a, 54a, and 55a of the connector plug 50 are connected to the contact terminals 91, 92, 93, 94, and 95, respectively, of the connector jack 90. Therefore, even when the electronic pen main unit 3 rotates around the center line in the axial center direction, the electrical connection is always kept, and electrical noncontact can be avoided.

Due to the above configuration, when the electronic pen main unit 3 is fitted to the fitting part 43a of the rotor 43 of the knock cam mechanism unit 4 of the pen casing 2 of the electronic pen 1, both ends of the capacitor 10 housed in the electronic pen main unit 3 are connected to the electrodes 2*d* and 2*e* for charging on the pen casing 2 of the electronic pen 1. Due to this, when a supply voltage is not stored in the capacitor 10, the capacitor 10 is charged through the electrodes 2*d* and 2*e* for charging, and a sufficient supply voltage is stored.

Furthermore, the electronic circuit of the electronic pen main unit 3 becomes capable of detecting the state of the side switch 2S and can transmit information regarding the detected state of the side switch 2S with the information included in a signal sent out by a core body 35. Moreover, the earth electrode of the electronic pen main unit 3 and the conductor band 2*f* of the pen casing 2 are electrically connected. Therefore, through grasping of the part of the conductor band 2*f* by the user, the earth electrode of the electronic pen main unit 3 can be grounded through the human body, and transmission and reception of signals from the electronic pen main unit 3 can be stably carried out.

Next, a configuration example of the pen tip side of the electronic pen main unit 3 of this embodiment will be further described with reference to FIGS. 3A and 3B and FIGS. 4A and 4B.

In this example, as illustrated in FIGS. 2A, 2B, and 2C and FIGS. 3A and 3B, the peripheral electrode 33 disposed on the pen tip side of the main body tubular part 31 is made into a shape having a cylindrical shape part 33*a* in which the outer diameter is constant and a tapered part 33*b* formed into a tapered shape in such a manner as to be gradually tapered toward the pen tip side. The metal pipe part 31*a* of the main body tubular part 31 has a cylindrical shape with an outer diameter equal to an outer diameter R2 (>R1) of the cylindrical shape part 33*a* of the peripheral electrode 33. For example, R2=2.2 millimeters is set.

The tubular joining component 32 is composed of an insulating material, resin in this example, and is a tubular body like one illustrated in FIG. 3B. At a middle position on its outer circumferential surface in the axial center direction, a ring-shaped flange part 32F that protrudes from this outer circumferential side surface in the direction orthogonal to the axial center direction is formed. This ring-shaped flange part 32F has a predetermined width W (see FIGS. 3A and 3B) in the axial center direction, and its end surface is flush with the main body tubular part 31 and the peripheral electrode 33 without having any step being generated and configures part of the main unit casing 30 as illustrated in FIGS. 3A and 3B. That is, the diameter of the outer circumferential part of the ring-shaped flange part 32F is selected to be equal to the outer diameter of the peripheral electrode 33 and the metal pipe part 31*a* of the main body tubular part 31.

Furthermore, the pen tip side, which is one side in the axial center direction, relative to the ring-shaped flange part 32F in this tubular joining component 32 is made into a first fitting tubular part 32*a* fitted to the cylindrical shape part 33*a* of the peripheral electrode 33, and the configuration is made in such a manner that the cylindrical shape part 33*a* of the peripheral electrode 33 is joined to the first fitting tubular part 32*a* through being press-fitted thereto until reaching the place of the ring-shaped flange part 32F.

Moreover, the rear end side in the axial center direction relative to the ring-shaped flange part 32F in the tubular joining component 32 is made into a second fitting tubular part 32*b* fitted to the metal pipe part 31*a* of the main body tubular part 31, and the configuration is made in such a manner that the metal pipe part 31*a* of the main body tubular part 31 is joined to the second fitting tubular part 32*b* through being press-fitted thereto until reaching the place of the ring-shaped flange part 32F.

In the state in which the metal pipe part 31*a* of the main body tubular part 31 and the peripheral electrode 33 are joined to the tubular joining component 32, the main unit casing 30 of one tubular body is formed as illustrated in FIG. 2A and FIGS. 1A and 1B. Furthermore, the metal pipe part 31*a* of the main body tubular part 31 composed of an electrically-conductive material and the peripheral electrode 33 are not in contact and are in a state of being electrically isolated (insulated) from each other due to the existence of the ring-shaped flange part 32F of the tubular joining component 32.

As illustrated in FIG. 3B, the hollow part 30*a* exists inside the main unit casing 30. Furthermore, a front cap 34 composed of an insulating material is mounted on the pen tip side of the peripheral electrode 33 of the main unit casing 30 as illustrated in FIG. 2A and FIGS. 3A and 3B. The front cap 34 has, on its tip side, an opening 34*a* (see FIG. 3B) with a diameter larger than that of the center electrode 35 and the opening 34*a* communicates with the hollow part 30*a* of the main unit casing 30.

The center electrode 35 is what configures a core body of the electronic pen main unit 3 of this embodiment and is composed of an electrically-conductive component, in this example, an electrically-conductive metal. Furthermore, as illustrated in FIG. 3B, this center electrode 35 is inserted into the main unit casing 30 from the opening 34*a* of the front cap 34, and the end part on the side opposite to the pen tip side is mounted to the core body holding component 7 attachably and detachably.

The core body 35 and the peripheral electrode 33 that are composed of the electrically-conductive material are electrically isolated (insulated) by the front cap 34 that is the insulating material as illustrated in FIG. 3B. In the electronic pen main unit 3 of this embodiment, when the center electrode 35 is mounted, the peripheral electrode 33 is disposed to surround the rear end side relative to a tip part 35*a* that becomes the pen tip in the center electrode 35 as illustrated in FIG. 3B. In the following description, the center electrode 35 will be referred to as the core body 35.

The tapered part 33*b* on the pen tip side in the peripheral electrode 33 of the main unit casing 30 has a diameter that gradually becomes smaller as the position gets closer to the pen tip side. In this embodiment, as illustrated in FIG. 2A, the pen tip side relative to a middle position in the axial center direction in the tapered part 33*b* is configured to be equal to or smaller than the diameter R0 of the opening 2*b* on the pen tip side in the pen casing 2.

The electronic pen main unit 3 with the above configuration can be housed in the pen casing 2 by fitting its main body tubular part 31 to the fitting part 43*a* of the rotor 43 of the knock cam mechanism unit 4. Furthermore, in the electronic pen 1 of this embodiment, the user presses down the end part 42*a* of the knock bar 42 when using the electronic pen 1 with a position detecting device. Thereupon, in the electronic pen 1, the state is made in which, as illustrated in FIG. 1B, the tip part 35*a* of the core body 35, the front cap 34, and a part of the pen tip side of the tapered part 33*b* of the peripheral electrode 33 protrude to the external from the opening 2*b* of the pen casing 2.

After the use of the electronic pen 1 ends, by pressing down the end part 42*a* of the knock bar 42 again, the state can be made in which the whole of the electronic pen main unit 3 is housed in the hollow part 2*a* of the pen casing 2 as illustrated in FIG. 1A. At this time, the whole of the electronic pen main unit 3 is housed in the hollow part 2*a* of the pen casing 2, and the tip part 35a of the core body 35 of the electronic pen main unit 3 enters the state of being protected by the pen casing 2.

Moreover, in this embodiment, as illustrated in FIG. 3B, a board holder 300 in which the printed board 9 is placed on a board placement pedestal 301 is housed in the hollow part 30a of the main unit casing 30.

The board holder 300 is composed of an insulating resin and has a writing pressure detecting unit holding part 302 for housing and holding the writing pressure detecting unit 8 on the side opposite to the side of the board placement pedestal 301 in the longitudinal direction that is the axial center direction of the electronic pen main unit 3. As illustrated in FIG. 3B, the board holder 300 is made to have a configuration in which the writing pressure detecting unit holding part 302 and the board placement pedestal 301 are continuous in the longitudinal direction that is the axial center direction of the electronic pen main unit 3 when the board holder 300 is housed in the hollow part of the main unit casing 30. The writing pressure detecting unit holding part 302 is made into a cylindrical shape having a hollow part inside which multiple parts of the writing pressure detecting unit 8 are housed. The board placement pedestal 301 is made into a shape that is a boat shape on which the printed board 9 is placed to be held, and is like one obtained by cutting a tubular body by substantially half along the axial center direction.

The board holder 300 is housed in the main unit casing 30 in such a manner that the writing pressure detecting unit holding part 302 is set on the pen tip side. Furthermore, the configuration is made in such a manner that the core body holding component 7 that is fitted to the core body 35 and holds the core body 35 is joined to the writing pressure detecting unit 8 held by this writing pressure detecting unit holding part 302, and the pressure (writing pressure) applied to the core body 35 is transmitted to the writing pressure detecting unit 8.

The board holder 300 is subjected to position restriction in such a manner as not to move in the axial center direction in the main unit casing 30 through fitting and joining of the writing pressure detecting unit holding part 302 to the second fitting tubular part 32b of the tubular joining component 32 in the axial center direction as illustrated in FIG. 3B.

Furthermore, although diagrammatic representation is omitted, both ends of the capacitor 10 disposed on the side opposite to the writing pressure detecting unit holding part 302 and copper foil patterns of a power supply line and an earth line of the printed board 9, on the board placement pedestal 301 of the board holder 300, are electrically connected. Due to this, the voltage of the capacitor 10 is supplied to the circuit formed on the printed board 9 as a supply voltage.

In this embodiment, the metal pipe part 31a of the main body tubular part 31 composed of the electrically-conductive material is electrically connected to the copper foil pattern of the earth line of the printed board 9.

In this embodiment, on the printed board 9, disposed is a circuit part that is composed of the signal transmitting circuit that generates signals to be sent out from the core body 35 and the peripheral electrode 33, an IC (Integrated Circuit) 100 (see FIGS. 3A and 3B) that configures a control circuit that controls transmission of the signals from the signal transmitting circuit to the core body 35 and the peripheral electrode 33, and peripheral circuit part thereof. A charging circuit of the capacitor 10 is included in the peripheral circuit part although diagrammatic representation is omitted. The charging circuit of the capacitor 10 may be disposed outside the electronic pen 1.

As illustrated in FIG. 3B and an exploded perspective view of FIG. 4A, the core body holding component 7 that holds the core body 35 through fitting is composed of an electrically-conductive elastic component 71, a core body holder 72, a coil spring 73, and a conductor terminal component 74. The core body holding component 7 also plays a role as a transmitting component of the writing pressure applied to the core body 35 for the writing pressure detecting unit 8.

In this embodiment, as illustrated in FIG. 3B and FIG. 4B, the core body 35 is fitted into the core body holder 72 composed of an electrically-conductive material through the electrically-conductive elastic component 71 and is thereby joined to the core body holder 72 to be held. The electrically-conductive elastic component 71 is composed of, for example, electrically-conductive rubber and is formed into a cylindrical shape having a through-hole 71a into which the end part of the core body 35 on the side opposite to the tip part 35a is fitted.

The core body holder 72 is composed of an electrically-conductive material, for example, SUS (Steel Special Use Stainless), and is an object in which a housing fitting part 721 having a recessed hole 721a in which the electrically-conductive elastic component 71 is housed and fitted and a bar-shaped part 722 fitted into a holding component 83 to be described later in the writing pressure detecting unit 8 are monolithically formed.

Furthermore, the configuration is made in such a manner that the pressure (writing pressure) applied to the core body 35 is transmitted to the writing pressure detecting unit 8 through fitting of a tip part 722a of the bar-shaped part 722 of the core body holder 72 into the holding component 83 of the writing pressure detecting unit 8 held by the writing pressure detecting unit holding part 302. In this case, the configuration is made in such a manner that the core body holder 72 is always biased toward the side of the core body 35 against the board holder 300 by the coil spring 73 as an example of an elastic component composed of an electrically-conductive material such as an electrically-conductive metal.

The coil spring 73 configures, with the conductor terminal component 74, a component for electrical connection for transmitting a signal from the IC 100 disposed on the printed board 9 to the core body 35. In the electronic pen main unit 3 of this embodiment, a transmission signal generated by the signal transmitting circuit configured on the printed board 9 is supplied to the core body 35 through the component for electrical connection including this coil spring 73 and the conductor terminal component 74.

Specifically, in this embodiment, on the writing pressure detecting unit holding part 302 of the board holder 300, the conductor terminal component 74 composed of a material having electrical conductivity, for example, SUS, is mounted in such a manner as to cover the side of an opening 302a into which the bar-shaped part 722 of the core body holder 72 is inserted as illustrated in FIG. 4A.

As illustrated in FIGS. 4A and 4B, this conductor terminal component 74 has an abutting plate part 741 that covers the side of the opening 302a of the writing pressure detecting unit holding part 302 of the board holder 300 and has a through-hole 741a in which the bar-shaped part 722 of the core body holder 72 is inserted.

Furthermore, an extending part 742 that extends to the part of the board placement pedestal 301 is disposed across the part of the writing pressure detecting unit holding part 302 of the board holder 300. Moreover, in the state in which the conductor terminal component 74 is mounted on the writing pressure detecting unit holding part 302 of the board holder 300, as illustrated in FIG. 3B, a terminal part 742a at the tip of the extending part 742 that extends from the conductor terminal component 74 abuts against a conductor on the back surface side of the printed board 9 placed on the board placement pedestal 301 of the board holder 300 and is soldered thereto, for example. Due to this, the conductor terminal component 74 and the signal transmitting circuit disposed on the printed board 9 are electrically connected.

The bar-shaped part 722 of the core body holder 72 into which the electrically-conductive elastic component 71 is fitted is inserted into the hollow part of the writing pressure detecting unit holding part 302 of the board holder 300 through the through-hole 741a of the abutting plate part 741 of the conductor terminal component 74 and is fitted into the writing pressure detecting unit holding part 302 in the state in which the coil spring 73 is interposed. The inner diameter of the coil spring 73 is set larger than the outer shape of the bar-shaped part 722 of the core body holder 72.

The coil spring 73 elastically gets contact with the core body holder 72 and abuts against and elastically gets contact with the abutting plate part 741 of the conductor terminal component 74. The coil spring 73 is composed of an electrically-conductive material, and the electrically-conductive elastic component 71 and the core body holder 72 have electrical conductivity. Thus, the signal transmitting circuit disposed on the printed board 9 and the electrically-conductive elastic component 71 fitted into the core body holder 72 are electrically connected through the conductor terminal component 74. Therefore, fitting of the core body 35 into the electrically-conductive elastic component 71 makes the state in which a signal from the signal transmitting circuit disposed on the printed board 9 is supplied to the core body 35.

Next, description will be made about the configuration of the writing pressure detecting unit holding part 302 of the board holder 300 and the writing pressure detecting unit 8 and fitting of the holding component 83 of the writing pressure detecting unit 8 and the core body holder 72.

The writing pressure detecting unit 8 is housed in the writing pressure detecting unit holding part 302, and the configuration is made as illustrated in FIG. 3B, thereby configuring a module for writing pressure detection. Furthermore, the core body 35 is joined to this module for writing pressure detection through the core body holder 72. Due to this, the writing pressure applied to the tip part 35a of the core body 35 is detected by the writing pressure detecting unit 8 of the module for writing pressure detection. In this case, the module for writing pressure detection detects the writing pressure through movement of a portion of the parts of the writing pressure detecting unit 8 that configures the module in the axial center direction together with the core body 35 and the core body holder 72 according to the writing pressure applied to the tip part 35a of the core body 35.

The writing pressure detecting unit 8 of this example is a case in which a capacitance-variable capacitor whose capacitance changes according to the writing pressure applied to the core body 35 is used, and is composed of multiple parts, a dielectric 81, a terminal component 82, a holding component 83, an electrically-conductive component 84, and an elastic component 85, as illustrated in FIG. 3B.

In the state in which the core body holder 72 is fitted into the writing pressure detecting unit holding part 302 of the board holder 300 as above, the core body 35 is press-fitted into the through-hole 71a of the electrically-conductive elastic component 71 fitted into the core body holder 72. Due to this, the core body 35 is firmly held with respect to the core body holder 72 by the electrically-conductive elastic component 71 as described above. The core body 35 can be pulled out in the direction toward the side of the tip part 35a from the state of being fitted into the core body holder 72 and being held and can be replaced as described above.

In this electronic pen main unit 3, when a pressure is applied to the tip part 35a of the core body 35, the core body 35 is displaced toward the rear end side in the axial center direction according to the pressure. Due to this displacement, the holding component 83 in the writing pressure detecting unit holding part 302 is displaced toward the side of the dielectric 81 against an elastic biasing force of the elastic component 85. As a result, the electrically-conductive component 84 fitted into the holding component 83 is displaced toward the side of the dielectric 81, so that the distance between the electrically-conductive component 84 and the dielectric 81 and the contact area between the electrically-conductive component 84 and the dielectric 81 change according to the pressure applied to the core body 35.

Due to this, the capacitance of a capacitance-variable capacitor formed between the terminal component 82 that configures a first electrode and the electrically-conductive component 84 that configures a second electrode changes according to the pressure applied to the core body 35. This change in the capacitance of the capacitance-variable capacitor is detected by the IC 100 disposed on the printed board 9, and the writing pressure is detected.

The writing pressure detecting unit 8 is not limited to one with the above-described configuration. For example, one in which a capacitance-variable capacitor includes a semiconductor chip formed of a MEMS (Micro Electro Mechanical Systems) element (refer to patent document (Japanese Patent Laid-open No. 2013-161307), for example) may be used.

Next, description will be made about the peripheral electrode 33 and an electrical connection with the circuit part of the printed board 9. In the outer circumferential surface of the tubular joining component 32, a recessed groove (diagrammatic representation is omitted) is formed from the first fitting tubular part 32a to the second fitting tubular part 32b by passing through the lower part of the ring-shaped flange part 32F in the direction along the axial center direction of the tubular joining component 32.

Furthermore, a recessed groove (diagrammatic representation is omitted) continuous with the recessed groove of the second fitting tubular part 32b is formed also in the circumferential side surface of the writing pressure detecting unit holding part 302 of the board holder 300. In this continuous recessed groove, as illustrated in FIG. 3B, a connection terminal conductor 11 composed of an electrically-conductive material, in this example, an electrically-conductive metal, is disposed. Furthermore, as illustrated in FIG. 3B, an end part 11a of the connection terminal conductor 11 disposed in the recessed groove on the side of the first fitting tubular part 32a of the tubular joining component 32 is disposed in such a manner that at least part of the end part 11a slightly bulges out relative to the outer circumferential surface of the first fitting tubular part 32a. However, the depth of the recessed groove of the part of the end part 11a is set to a depth that allows the end part 11a to be elastically pressed downward when the end part 11a is pressed down from above.

Due to this, the configuration is made in such a manner that the end part 11a of the connection terminal conductor 11 surely gets contact with the inner wall of the peripheral electrode 33 and the state in which the peripheral electrode 33 and the connection terminal conductor 11 are electrically connected is made when the peripheral electrode 33 is fitted to the first fitting tubular part 32a of the tubular joining component 32. Furthermore, an end part 11b that extends to the side of the printed board 9 of the connection terminal conductor 11 is electrically connected to the side of a back surface 9b of the printed board 9 as illustrated in FIG. 3B. Although diagrammatic representation is omitted, the end part 11b of the connection terminal conductor 11 is electrically connected to the circuit part on the front surface side of the printed board 9 via a through-hole.

The depth of the recessed groove in which the connection terminal conductor 11 is disposed is set to a depth with which the connection terminal conductor 11 does not get contact with the metal pipe part 31a when the metal pipe part 31a of the main body tubular part 31 is fitted to the second fitting tubular part 32b. Alternatively, an insulator may be interposed between the connection terminal conductor 11 and the metal pipe part 31a.

Electronic Circuit Configuration Example of Electronic Pen Main Unit 3

Next, an electrical configuration example of the electronic pen main unit 3 of this embodiment is illustrated in FIG. 5. In this example, as illustrated in FIG. 5, a control circuit 101 includes the IC 100 disposed on the printed board 9. Furthermore, to this control circuit 101, a signal transmitting circuit 102 and a signal receiving circuit 103 are connected and a variable-capacitance capacitor 8C including the writing pressure detecting unit 8 is connected. A resistor 8R is connected in parallel to the variable-capacitance capacitor 8C.

Moreover, a signal output end of the signal transmitting circuit 102 is connected to the core body 35 through a switch circuit 104. In this case, the interposition of the conductor terminal component 74, the core body holder 72, and the electrically-conductive elastic component 71 between the core body 35 and the switch circuit 104 is as described above.

Furthermore, in this example, the signal output end of the signal transmitting circuit 102 is connected to a terminal S of a changeover switch circuit 105. A movable terminal M of this changeover switch circuit 105 is connected to the peripheral electrode 33. In this case, the connection terminal conductor 11 is interposed between the peripheral electrode 33 and the changeover switch circuit 105.

A terminal R of the changeover switch circuit 105 is connected to an input end of the signal receiving circuit 103. Furthermore, a terminal G of the changeover switch circuit 105 is connected to an earth electrode (ground electrode).

Moreover, the control circuit 101 supplies the switch circuit 104 with a control signal SW1 that carries out on/off-control of the switch circuit 104. Furthermore, the control circuit 101 supplies the changeover switch circuit 105 with a changeover control signal SW2 to switch which of the terminal S, the terminal R, and the terminal G the movable terminal M is to be connected to.

Although diagrammatic representation is omitted, the voltage of the capacitor 10 is supplied to each of the control circuit 101, the signal transmitting circuit 102, the signal receiving circuit 103, the switch circuit 104, and the changeover switch circuit 105 as a supply voltage.

The signal receiving circuit 103 receives a signal received by the peripheral electrode 33 through capacitive coupling (electric field coupling) with a position detecting sensor of a position detecting device and executes processing of demodulation and so forth according to the received signal to send a signal of the processing result to the control circuit 101.

The control circuit 101 analyzes the signal from the signal receiving circuit 103 and determines the specifications of the position detecting device of the counterpart. In addition, the control circuit 101 settles the timing at which interaction of a signal is carried out with the position detecting sensor of the position detecting device of the counterpart. Furthermore, the control circuit 101 controls the format of a signal to be output from the signal transmitting circuit 102 in such a manner that the format becomes what matches the specifications of the position detecting device of the counterpart and carries out interaction with the position detecting sensor at the settled timing.

Basically, the signal transmitting circuit 102 outputs, under control of the control circuit 101, a signal including a signal for position detection (burst signal) with a predetermined frequency for position detection in the position detecting device and writing pressure information according to the writing pressure detected by the writing pressure detecting unit 8. Furthermore, the signal transmitting circuit 102 outputs also a signal for detection of a tilt angle of the electronic pen 1. That is, the signal transmitting circuit 102 sends out the burst signal for position detection and the burst signal for detection of the tilt angle of the electronic pen 1 under control by the control circuit 101.

Moreover, in the period in which the burst signal for position detection is being sent out from the signal transmitting circuit 102, the control circuit 101 carries out operation of detecting the writing pressure on the basis of the capacitance of the variable-capacitance capacitor 8C including the writing pressure detecting unit 8.

In this example, the control circuit 101 first charges the variable-capacitance capacitor 8C to the fully-charged state and thereafter stops the charging to thereby set the variable-capacitance capacitor 8C to the state of being discharged through the resistor 8R. Then, the control circuit 101 measures the time from the discharging start timing to the timing when the voltage across the variable-capacitance capacitor 8C becomes a predetermined voltage set in advance and detects the capacitance of the variable-capacitance capacitor 8C at the time from the time. The capacitance of the variable-capacitance capacitor 8C corresponds to the writing pressure applied to the core body 35 at the time and detects the writing pressure on the basis of the detected capacitance.

The control circuit 101 converts the detected writing pressure to a digital signal of multiple bits in this example and controls the signal transmitting circuit 102 to output writing pressure information according to this digital signal from this signal transmitting circuit 102.

Furthermore, a supply voltage Vcc stored in the capacitor 10 is supplied to each of the control circuit 101, the signal transmitting circuit 102, the signal receiving circuit 103, the switch circuit 104, and the changeover switch circuit 105. In this embodiment, a charging circuit 106 of the capacitor 10 is disposed on the printed board 9 and is connected to the terminals 52a and 51a of the connector plug 50 to which the electrodes 2d and 2e for charging are connected. Therefore, although diagrammatic representation is omitted, when the electrodes 2d and 2e for charging are connected to an AC power supply through an adapter for charging, the capacitor 10 is charged by the charging circuit 106.

Moreover, the side switch 2S disposed on the pen casing 2 is connected to the control circuit 101 through the terminals 53a and 54a of the connector plug 50. The control circuit 101 determines the on- and off-states of the side switch 2S and generates information regarding the determined state of the side switch 2S to transmit the generated information regarding the state of the side switch 2S to the position detecting device through the signal transmitting circuit 102.

The earth electrode (ground conductor) of the electronic pen main unit 3 is connected to the conductor band 2f through the terminal 55a of the connector plug 50.

Circuit Configuration Example of Position Detecting Device

Figure 6:
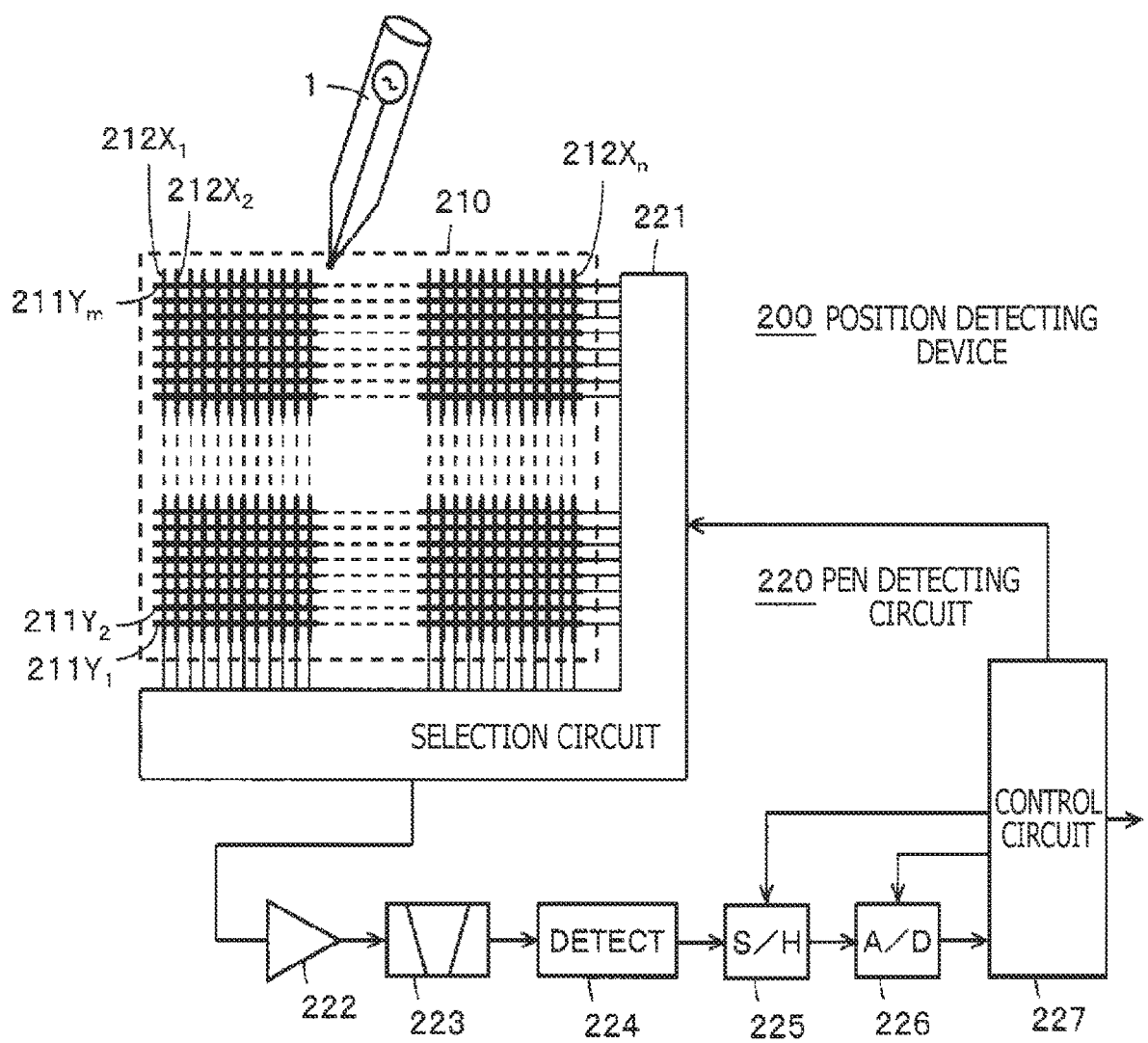
FIG. 6 is a diagram for explaining a configuration example of a position detecting device of a capacitive system used with the first embodiment of the electronic pen according to an embodiment disclosed herein.

Next, a circuit configuration example of the position detecting device and the position detecting sensor will be described. FIG. 6 is a block diagram for explaining a configuration example of a reception processing circuit of a signal from the electronic pen 1 in a position detecting device 200 of a capacitive system.

As illustrated in FIG. 6, the position detecting device 200 of this example is composed of a position detecting sensor 210 and a pen detecting circuit 220 connected to this position detecting sensor 210. In this example, the position detecting sensor 210 is composed of a first conductor group in which multiple first conductors $211Y_1$, $211Y_2$, ..., $211Y_m$ (m is an integer equal to or larger than 1) that extend along the horizontal direction (X-axis direction) are disposed in a Y-axis direction in parallel separately from each other by a predetermined interval and a second conductor group in which multiple second conductors $212X_1$, $212X_2$, ..., $212X_n$ (n is an integer equal to or larger than 1) that extend along the vertical direction (Y-axis direction) are disposed in the X-axis direction in parallel separately from each other by a predetermined interval.

In the following description, when there is no need to distinguish the multiple first conductors of the first conductor group and the multiple second conductors of the second conductor group from one another, the conductors will be referred to as the first conductor 211Y and the second conductor 212X.

The pen detecting circuit 220 is composed of a selection circuit 221 used as an input-output interface with the position detecting sensor 210, an amplification circuit 222, a band-pass filter 223, a detection circuit 224, a sample-hold circuit 225, an AD (Analog to Digital) conversion circuit 226, and a control circuit 227.

The selection circuit 221 selects one conductor 211Y or 212X from the first conductor group and the second conductor group on the basis of a control signal from the control circuit 227. The conductor selected by the selection circuit 221 is connected to the amplification circuit 222, and a signal from the electronic pen 1 (electronic pen main unit 3 thereof) is detected by the selected conductor and is amplified by the amplification circuit 222. The output of this amplification circuit 222 is supplied to the band-pass filter 223, and the component of the frequency of the signal transmitted from the electronic pen 1 is extracted.

An output signal of the band-pass filter 223 is detected by the detection circuit 224 and an output signal thereof is supplied to the sample-hold circuit 225 and is sampled and held by a sampling signal from the control circuit 227. Thereafter, the signal is converted to a digital value by the AD conversion circuit 226. Digital data from the AD conversion circuit 226 is read by the control circuit 227 and is processed.

The control circuit 227 sends out a control signal to each of the sample-hold circuit 225, the AD conversion circuit 226, and the selection circuit 221. In addition, the control circuit 227 calculates position coordinates on the position detecting sensor 210 indicated by the electronic pen 1 from the digital data from the AD conversion circuit 226 and detects writing pressure information.

Furthermore, the control circuit 227 detects a tilt angle of the electronic pen 1 in a manner described below. A method of the detection of the tilt angle of the electronic pen 1 in this position detecting device 200 will be described with reference to FIGS. 7A, 7B, 7C, 7D, 7E, and 7F.

Figure 7A:
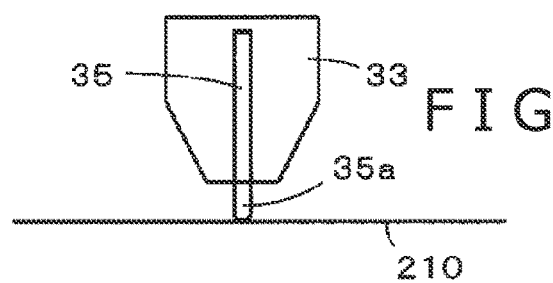
FIGS. 7A, 7B, 7C, 7D, 7E, and 7F depict diagrams used for explaining a detection method of a tilt angle of the electronic pen in the position detecting device of the example of FIG. 6.
Figure 7B:
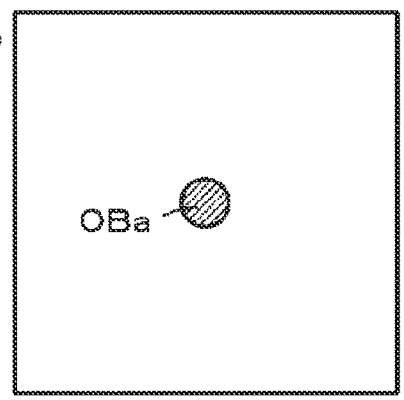
Figure 7C:
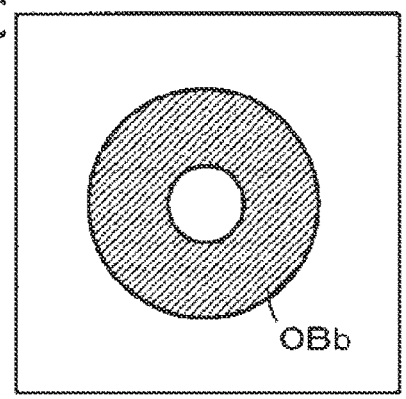

When the core body 35 of the electronic pen main unit 3 of the electronic pen 1 is in the perpendicular state with respect to the input surface of the position detecting sensor 210 as illustrated in a schematic diagram of FIG. 7A, in a position detection period Ta, capacitive coupling is made between the tip part 35a of the core body 35 and the position detecting sensor 210 and a region OBa in which the capacitive coupling is made is a region of a true circle as illustrated in FIG. 7B. On the other hand, in a tilt detection period Tb, capacitive coupling is made between the peripheral electrode 33 and the position detecting sensor 210 and a region OBa in which the capacitive coupling is made is a ring-shaped region as illustrated in FIG. 7C.

Figure 7D:
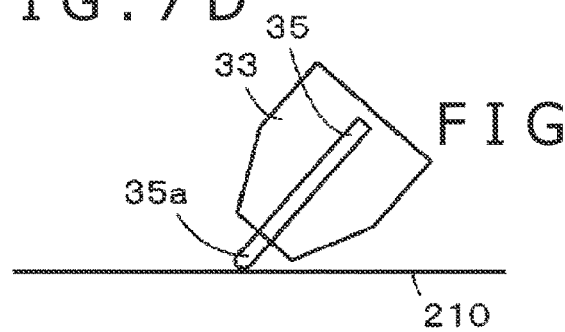
Figure 7E:
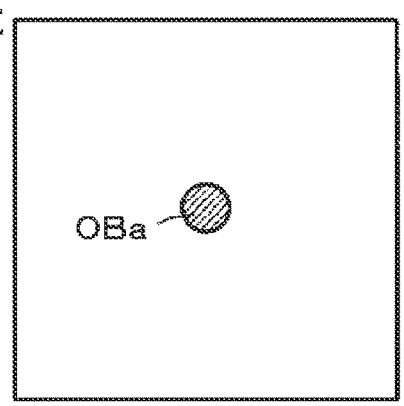

Furthermore, when the core body 35 of the electronic pen main unit 3 of the electronic pen 1 is in a tilt state with respect to the input surface of the position detecting sensor 210 as illustrated in a schematic diagram of FIG. 7D, the region OBa in which capacitive coupling is made between the tip part 35a of the core body 35 and the position detecting sensor 210 in the position detection period Ta substantially remains the region of the true circle as illustrated in FIG. 7E. On the other hand, the region OBb in which capacitive coupling is made between the peripheral electrode 33 and the position detecting sensor 210 in the tilt detection period Tb becomes a region of an elliptical shape that is according to the tilt angle and extends long in the direction of the tilt as illustrated in FIG. 7F.

Figure 7F:
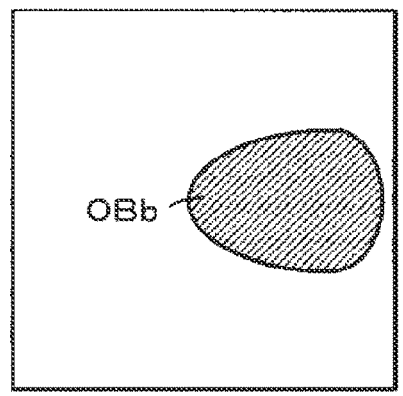

Therefore, in the control circuit 227 of the position detecting device 200, the magnitude of the tilt angle of the electronic pen 1 can be detected from the length in the major axis direction regarding the elliptical shape of the region OBb illustrated in FIG. 7F. Furthermore, the direction of the tilt of the electronic pen 1 can be detected by detecting the major axis direction of the elliptical shape of the region OBb with the indicated position of the electronic pen 1 illustrated in FIG. 7E being deemed as the point of origin.

In the above-described example, a signal with the same frequency as the signal supplied to the core body 35 is used for the peripheral electrode 33 used for detecting the tilt angle. However, the frequency of the signal supplied to the core body 35 and the frequency of the signal supplied to the peripheral electrode 33 may be made different. In this case, the signal from the core body 35 and the signal from the peripheral electrode 33 can be distinguished in the position detecting device 200. Thus, in the electronic pen main unit 3 of the electronic pen 1, the configuration may be made in such a manner that the signal from the core body 35 and the signal from the peripheral electrode 33 are concurrently sent out to the position detecting sensor 210 instead of carrying out the position detection period Ta and the tilt detection period Tb in a time-sharing manner as described above.

Effects of First Embodiment

According to the electronic pen main unit 3 of the above-described first embodiment, when the rear end part of the electronic pen main unit 3 is fitted to the fitting part 43a of the pen casing 2, the connector plug 50 of the electronic pen main unit 3 and the connector jack 90 of the fitting part 43a are joined. Due to this, the electronic circuit inside the electronic pen main unit 3 connected to the connector plug 50 of the electronic pen main unit 3 and electronic circuit components such as the electrodes 2d and 2e for charging, the side switch 2S, and the conductor band 2f on the pen casing 2 connected to the connector jack 90 of the pen casing 2 are electrically connected.

Furthermore, the connector jack 90 is disposed at the fitting part 43a moved by the knock cam mechanism unit 4 as the movement mechanism disposed in the pen casing 2, and the connector plug 50 is disposed at the rear end part of the electronic pen main unit 3 fitted to this fitting part. Therefore, the electrical connection is always secured even when the electronic pen main unit 3 moves in the axial center direction in the pen casing 2.

Moreover, in the above-described embodiment, the circular annular conductor contact parts of the terminal parts 51a, 52a, 53a, 54a, and 55a of the connector plug 50 are connected to the contact terminals 91, 92, 93, 94, and 95, respectively, of the connector jack 90. Therefore, even when the electronic pen main unit 3 rotates around the center line in the axial center direction, the electrical connection is always kept, and electrical non-contact can be avoided.

Furthermore, in the electronic pen 1 of this first embodiment, in use of the electronic pen 1 in which the pen tip side of the electronic pen main unit 3 protrudes to the external from the opening 2b of the pen casing 2 of the electronic pen 1, not only the tip part 35a of the core body 35 but also part of the tapered part 33b on the pen tip side in the peripheral electrode 33 protrudes from the opening 2b of the pen casing 2.

Therefore, according to the electronic pen 1 of this first embodiment, the distance between not only the tip part 35a of the core body 35 and the input surface of the position detecting sensor 210 but also the tapered part 33b on the pen tip side in the peripheral electrode 33 becomes short, and capacitive coupling (electric field coupling) between both the two becomes strong. Moreover, in this embodiment, because the pen tip side of the peripheral electrode 33 is made into the tapered part 33b, the cross-sectional area of the tip part thereof on the pen tip side is small, and the electric field coupling is made more strongly with the position detecting sensor 210.

Therefore, the electronic pen 1 of this first embodiment can strongly make electric field coupling with the position detecting sensor 210 even when being made thinner. In the position detecting device 200, it becomes possible to detect sensing of the position indicated by the electronic pen 1 with high sensitivity. In addition, in the electronic pen main unit 3 of the electronic pen 1 of this first embodiment, a signal from the position detecting device 200 is received by the peripheral electrode 33, and the electronic pen main unit 3 starts transmission of a signal at a timing ordered by the received signal. This allows the position detecting device to wait for reception of the signal from the electronic pen main unit 3 while predicting transmission of the signal from the electronic pen main unit 3 of the electronic pen 1, and favorable operation can be implemented even with the electric field coupling with smaller coupling strength compared with the electromagnetic induction system.

Another Example of Fitting Configuration Between Electronic Pen Main Unit and Fitting Part of Pen Casing The connector plug 50 as an example of the rear-end-part connector of the electronic pen main unit 3 and the connector jack 90 as an example of the connector for joining at the fitting part 43a of the pen casing 2 are one example of the rear-end-part connector of the electronic pen main unit and the connector for joining at the fitting part of the pen casing, and the fitting configuration is not limited thereto.

Figure 8:
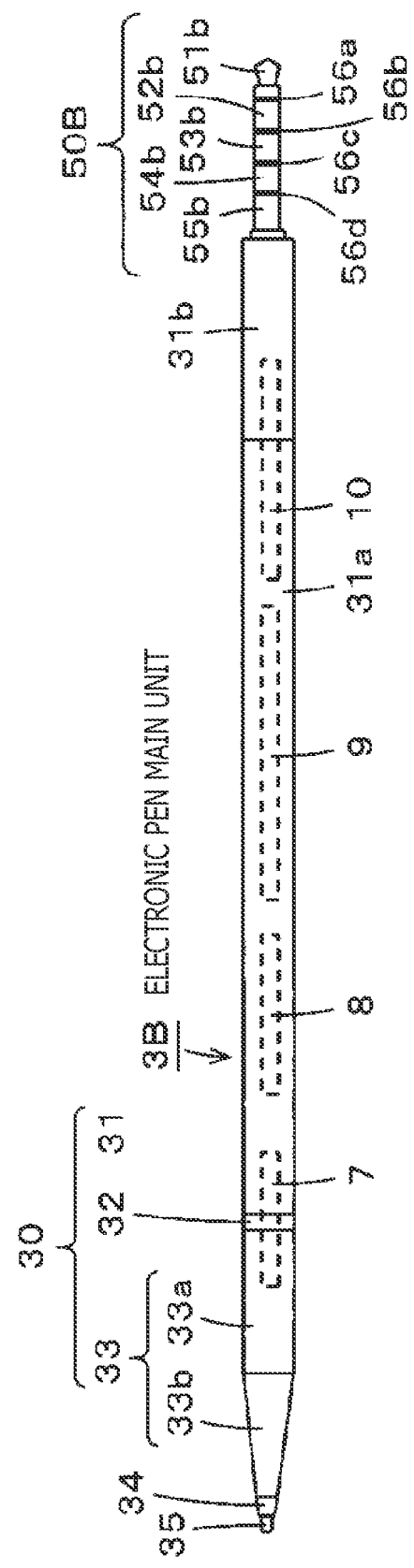
FIG. 8 is a diagram for explaining a configuration of a modification example of the first embodiment of the electronic pen main unit according to an embodiment disclosed herein.

FIG. 8 illustrates another example of the rear-end-part connector of the electronic pen main unit and the connector for joining at the fitting part of the pen casing. In an electronic pen main unit 3B of this example, the configuration of the rear-end-part connector is different from the example of FIG. 2A, and the others are similar to the electronic pen main unit 3 of the above-described first embodiment. Thus, in the following description, in the electronic pen main unit 3B, a constituent part similar to that of the electronic pen main unit 3 is given the same reference numeral, and detailed description thereof is omitted.

In the electronic pen main unit 3B of this example, a connector plug 50B as an example of the rear-end-part connector is disposed at the rear end part of the resin pipe part 31b of the main body tubular part 31. This connector plug 50B is what has a configuration similar to that of a pin plug for audio (for example, 5-pole pin plug with a noise cancelling function). In this example, five terminal parts 51b, 52b, 53b, 54b, and 55b are in the state in which circular annular conductor contact parts with the same diameter are exposed at positions different in the axial center direction.

Specifically, the terminal part 51b at the tip of the five terminal parts 51b, 52b, 53b, 54b, and 55b is made into a tip terminal. The middle three terminal parts 52b, 53b, and 54b are each made into a ring terminal insulated from other terminal parts by insulating rings 56a, 56b, 56c, and 56d. The terminal part 55b on the root side of the electronic pen main unit 3B is made into a sleeve terminal.

A connector jack as an example of the connector for joining that is joined to the connector plug 50B of the electronic pen main unit 3B of this example and is disposed at the fitting part 43a of the pen casing 2 includes five contact terminals that get contact with each of the circular annular conductor contact parts of the five terminal parts 51b, 52b, 53b, 54b, and 55b and form an electrical connection similarly to FIG. 2B although diagrammatic representation is omitted here. Also in this example, the terminal parts 51b, 52b, 53b, 54b, and 55b of the connector plug 50B are each electrically connected to a respective one of the electrodes 2e and 2d for charging, both ends 2Sa and 2Sb of the side switch 2S, and the conductor band 2f on the pen casing 2 through the five contact terminals disposed in the connector jack.

Also in this example, the circular annular conductor contact parts of the terminal parts 51b, 52b, 53b, 54b, and 55b of the connector plug 50B are connected to a respective one of the five contact terminals of the connector jack of the fitting part 43a. Therefore, even when the electronic pen main unit 3B rotates around the center line in the axial center direction, the electrical connection is always kept, and electrical non-contact can be avoided.

In the above-described example, the rear-end-part connector of the rear end part on the side opposite to the pen tip side in the main body tubular part 31 of the electronic pen main unit 3 or the electronic pen main unit 3B is made to have a configuration of a connector plug, and the connector for joining at the fitting part 43a of the pen casing 2 is made to have a configuration of a connector jack. However, conversely, the rear-end-part connector of the electronic pen main unit 3 or the electronic pen main unit 3B may be made to have a configuration of a connector jack, and the connector for joining at the fitting part 43a of the pen casing 2 may be made to have a configuration of a connector plug.

Second Embodiment

An electronic pen of this second embodiment is a modification example of the first embodiment. In the above-described first embodiment, one electronic pen main unit 3 or electronic pen main unit 3B is housed in the pen casing 2 of the electronic pen 1. In this second embodiment, multiple electronic pen main units are housed in a pen casing of an electronic pen. Furthermore, by a knock mechanism as an example of the movement mechanism, one of the multiple electronic pen main units is selected, and the tip of the pen tip part of the selected electronic pen main unit is protruded from an opening of the casing on the pen tip side and is used.

The electronic pen main unit 3 or the electronic pen main unit 3B of the electronic pen 1 of the first embodiment is made to have a configuration that can establish compatibility with a replacement core of a ballpoint pen except the configuration of the rear end side fitted to the fitting part 43a of the pen casing 2. As a commercially-available ballpoint pen, a multi-color ballpoint pen in which replacement cores different in the ink color are mounted exists. This second embodiment provides an electronic pen including housing the electronic pen main unit 3 in a casing with a configuration similar to that of the casing of this multi-color ballpoint pen.

Figure 9:
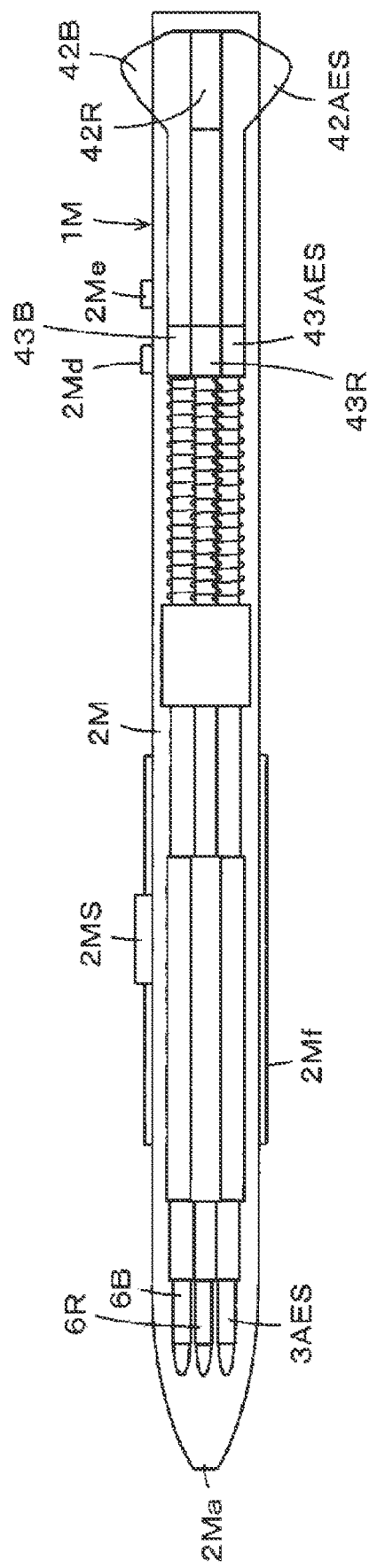
FIG. 9 is a diagram for explaining a configuration example of an electronic pen main unit used for a second embodiment of the electronic pen according to an embodiment disclosed herein.

FIG. 9 is a configuration diagram illustrating the appearance of an electronic pen 1M of this second embodiment. Also in this example of FIG. 9, a pen casing 2M of the electronic pen 1M is composed of a transparent synthetic resin and is illustrated to be in the state in which the inside thereof is visible in a see-through manner.

The pen casing 2M of the electronic pen 1M has almost the same configuration as a casing and a knock mechanism of a commercially-available knock-type multi-color ballpoint pen. However, similarly to the pen casing 2 and the knock cam mechanism unit 4 of the electronic pen 1 of the first embodiment, a configuration in which electrodes 2Md and 2Me for charging, a side switch 2MS, and a conductor band 2Mf are disposed on the pen casing 2M and a configuration of a fitting part to which an electronic pen main unit 3AES is fitted in the knock mechanism are different from the casing and the knock mechanism of the commercially-available knock-type multi-color ballpoint pen.

In this example of FIG. 9, in the pen casing 2M, one electronic pen main unit 3AES is housed and replacement cores of ballpoint pens of two colors, for example, a replacement core 6R of a red ballpoint pen and a replacement core 6B of a black ballpoint pen, are housed. The electronic pen main unit 3AES is configured similarly to the electronic pen main unit 3 or the electronic pen main unit 3B of the first embodiment except that the electronic pen main unit 3AES is configured with the same dimensions as the replacement core of the multi-color ballpoint pen, and includes a rear-end-part connector with a configuration similar to that of the connector plug 50 or 50B, for example, on the rear end side of the main body tubular part 31.

Furthermore, the knock mechanism of the electronic pen 1M is equipped with knock bars 42AES, 42R, and 42B to which the electronic pen main unit 3AES and the replacement cores 6R and 6B of the red and black ballpoint pens, respectively, are fitted. A fitting part 43AES disposed on the knock bar 42AES is made to have a configuration including a joining connector joined to the rear-end-part connector configured at the rear end part of the electronic pen main unit 3AES similarly to the fitting part 43a of the knock cam mechanism unit 4 in the first embodiment. Therefore, the electrodes 2Md and 2Me for charging, the side switch 2MS, and the conductor band 2Mf are electrically connected to five terminals of the connector for joining.

The fitting parts 43R and 43B of the knock bars 42R and 42B are made into fitting parts of a multi-color ballpoint pen.

Any of the knock bars 42AES, 42R, and 42B is moved by sliding toward the pen tip side, and thereby the pen tip side of the electronic pen main unit 3AES or either the replacement core 6R or 6B of the red or black ballpoint pen protrudes from an opening 2Ma of the pen casing 2M. Furthermore, by the slide movement of the knock bar 42AES toward the pen tip side, the tip part 35a of the core body 35 and a part of the peripheral electrode 33 of the electronic pen main unit 3AES protrude to be caused to make electric field coupling with a position detecting sensor of a position detecting device.

In a case of the electronic pen 1M of the second embodiment, the electronic pen main unit 3AES and the replacement cores 6R and 6B of ballpoint pens are housed in the pen casing 2M, and therefore the axial center direction of the electronic pen main unit 3AES deviates from the opening 2Ma of the pen casing 2M. Thus, when the pen tip part of the electronic pen main unit 3AES is let out and protruded from the opening 2Ma of the pen casing 2M by using the knock mechanism, the electronic pen main unit 3AES pushed out slightly bends with respect to the fitting part 43AES of the pen casing 2M.

However, the main body tubular part 31 of the electronic pen main unit 3AES of this embodiment includes the resin pipe part 31b. Therefore, due to the elasticity of this resin pipe part 31b, it is possible to deal with the bending of the electronic pen main unit 3 at the time of letting-out of the tip part of the electronic pen main unit 3. In a case of dealing with a mechanism of the casing of a multi-color ballpoint pen like this second embodiment, it is preferable that the length of the resin pipe part 31b in the axial center direction be adjusted to a length with which the bending at the time of letting-out of the tip part of the electronic pen main unit 3AES can be favorably absorbed by the resin pipe part 31b.

In the above-described second embodiment, the fitting part 43AES of the knock bar 42AES in the three knock bars 42AES, 42R, and 42B is made to have a configuration including a conductor to which the electronic pen main unit 3 or the electronic pen main unit 3B can be fitted. However, two or all of the fitting parts of the three knock bars 42AES, 42R, and 42B may be made into ones for the electronic pen main unit 3 or the electronic pen main unit 3B, and the fitting parts may be made into ones with a configuration including a conductor. However, in the electronic pen main unit 3 or the electronic pen main unit 3B in this case, it is preferable that an IC and a peripheral circuit thereof for implementing a function of transmitting its own identification information to a position detecting device be disposed in the main unit casing 30 in which electronic circuit components are disposed.

In this case, the position detecting device used with the electronic pen main unit 3 or the electronic pen main unit 3B has a function of receiving and determining the identification information transmitted from each of the electronic pen main units 3 or the electronic pen main units 3B. Furthermore, the position detecting device determines the difference among the electronic pen main units 3AES fitted to the fitting parts 43AES, 43R, and 43B and implements functions assigned to the respective ones. For example, in a case in which all of the fitting parts of the three knock bars 42AES, 42R, and 42B are made into ones for the electronic pen main unit 3 or the electronic pen main unit 3B, to the electronic pen main unit fitted to the fitting part 43R, a function of representing a writing locus (character or figure) displayed according to the indicated position thereof by red can be assigned. Furthermore, to the electronic pen main unit fitted to the fitting part 43B, a function of representing a writing locus displayed according to the indicated position thereof by black can be assigned. Moreover, to the electronic pen main unit fitted to the fitting part 43AES, a function of erasing a writing locus input through indication previously according to the indicated position thereof can be assigned.

The functions assigned to the electronic pen main units are not only the display color of the locus according to the indicated position as in this example and may be the kinds of displayed line, such as the thickness of a locus, a solid line, a dotted line, and a one-dot chain line.

When multiple electronic pen main units 3 or 3B are housed in the pen casing 2M, the electrodes 2Ed and 2Ee for charging and the conductor band 2Mf can be made common to these multiple electronic pen main units 3 or 3B. Furthermore, the side switch 2MS may be made common to the multiple electronic pen main units 3 or 3B housed in the pen casing 2M, or multiple side switches may be disposed on the pen casing 2M corresponding to a respective one of the multiple electronic pen main units 3 or 3B housed in the pen casing 2M.

Furthermore, although the second embodiment is the example including the three knock bars, the number of knock bars may be two or may be four or more.

Other Embodiments of Electronic Pen Main Unit

Figure 10A:
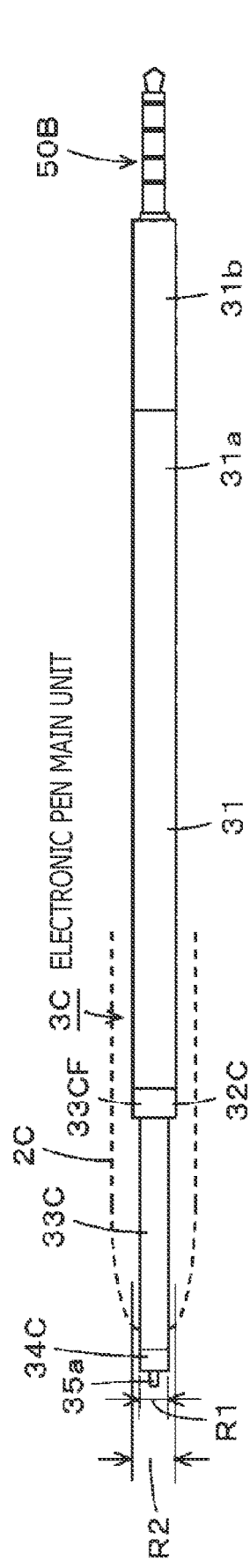
FIGS. 10A, 10B, and 10C depict diagrams for explaining configuration examples of other embodiments of the electronic pen main unit according to an embodiment disclosed herein.
Figure 10B:
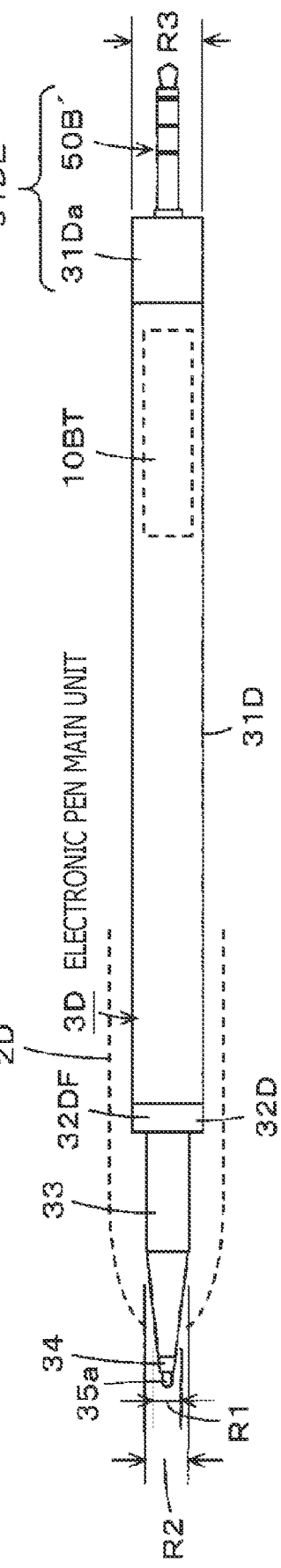
Figure 10C:
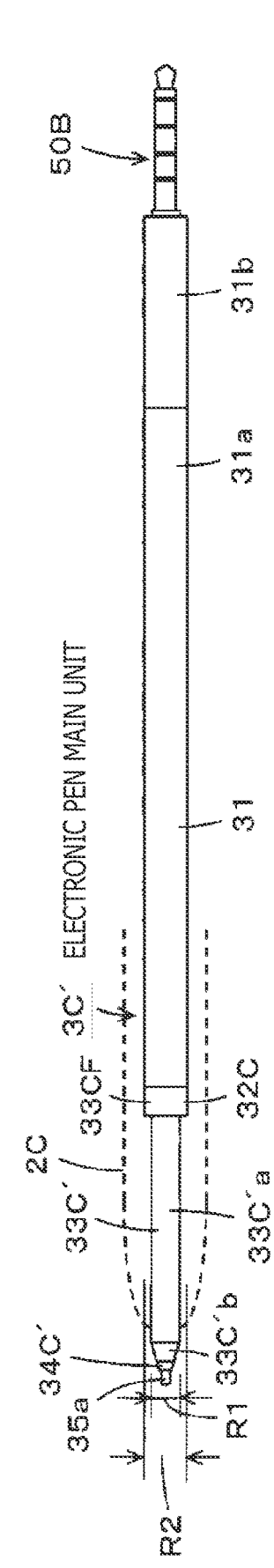

In FIGS. 10A, 10B, and 10C, other embodiments of the electronic pen main unit are illustrated. FIG. 10A illustrates a modification example of another example of the electronic pen main unit 3B illustrated in FIG. 8 in the above-described first embodiment. This example is an example configured in consideration of common use with a replacement core of a ballpoint pen similarly to the second embodiment. In description of an electronic pen main unit 3C of this embodiment, a constituent part similar to that of the above-described electronic pen main unit 3B is given the same reference numeral, and detailed description thereof is omitted.

In the electronic pen main unit 3C of this embodiment, a peripheral electrode 33C with a different shape from the peripheral electrode 33 of the electronic pen main unit 3B of the first embodiment is used. Specifically, as illustrated in FIG. 10A, the peripheral electrode 33C of the electronic pen main unit 3C of this embodiment is made into a tubular shape whose outer diameter is constant in the axial center direction, and the outer diameter is set to a diameter R1 smaller than the diameter of the opening 2b (see FIGS. 1A and 1B) of the pen casing 2 of the electronic pen.

Thus, in the electronic pen main unit 3C of this embodiment, because the configuration of the peripheral electrode 33C is different from that of the electronic pen main unit 3 in the first embodiment, a tubular joining component 32C that joins the peripheral electrode 33C to the main body tubular part 31 is configured in conformity to the configuration of the peripheral electrode 33C in such a manner that the peripheral electrode 33C can be joined to the main body tubular part 31 with the interposition of a ring-shaped flange part 32CF. Furthermore, a front cap 34C is also configured with change in conformity to the configuration of the peripheral electrode 33C. The others are made to have a configuration similar to that of the electronic pen main unit 3 of the first embodiment.

On the rear end side of the electronic pen main unit 3C in this example of FIG. 10A, the connector plug 50B as an example of the rear-end-part connector is disposed in this example similarly to the electronic pen main unit 3B. Furthermore, the electronic pen main unit 3C is fitted to the fitting part 43a of the pen casing 2 of the electronic pen 1 and the connector plug 50B as an example of the rear-end-part connector is electrically connected to a connector jack as an example of the connector for joining at the fitting part 43a.

Therefore, also in the electronic pen using the electronic pen main unit 3C of this example of FIG. 10A, the same operation and effects as the electronic pen 1 of the first embodiment can be obtained. At the time of use, the core body 35, the front cap 34C, and a part of the peripheral electrode 33C on the pen tip side protrude to the external from an opening of a casing 2C of the electronic pen illustrated by dotted lines in FIG. 10A. In this case, the cylindrical part with the constant outer diameter in the peripheral electrode 33C is located at the part of opening of the casing 2C. Therefore, by adjusting the outer diameter of the cylindrical part of this peripheral electrode 33C, the pen tip side of the electronic pen main unit 3C can be easily kept from involving a backlash in the opening of the casing 2C.

Next, an example of FIG. 10B also illustrates a modification example of another example of the electronic pen main unit 3B illustrated in FIG. 8 in the above-described first embodiment. Parts of a main body tubular part 31D and a tubular joining component 32D of an electronic pen main unit 3D of this embodiment are different from the above-described electronic pen main unit 3B, and the other part is made into a similar configuration. Thus, also in the electronic pen main unit 3D of this embodiment, a constituent part similar to that of the electronic pen main unit 3B is given the same reference numeral and detailed description thereof is omitted.

The main body tubular part 31D of the electronic pen main unit 3D of this embodiment has an outer diameter R3 larger than the outer diameter R2 of the main body tubular part 31 of the above-described electronic pen main unit 3B. Furthermore, the inner diameter of the main body tubular part 31D of the electronic pen main unit 3D of this embodiment is set to a diameter larger than the inner diameter of the main body tubular part 31 of the electronic pen main unit 3 of the first embodiment.

Thus, in the electronic pen main unit 3D of this embodiment, because the configuration of the main body tubular part 31D is different from that of the electronic pen main unit 3B, the tubular joining component 32D that joins the peripheral electrode 33 to the main body tubular part 31D is configured in conformity to the configuration of the main body tubular part 31D in such a manner that the peripheral electrode 33 can be joined to the main body tubular part 31D with the interposition of a ring-shaped flange part 32DF.

The main body tubular part 31D of the electronic pen main unit 3D of this embodiment includes a hollow part with a large space. Furthermore, in the electronic pen main unit 3D of this embodiment, by use of the space of the large hollow part of this main body tubular part 31D, the configuration is made in such a manner that a primary cell (battery) 10BT is housed in the hollow part as illustrated in FIG. 10B instead of the capacitor 10 as the power storage element used in the above-described electronic pen main unit 3B. The other electronic circuit components in the main body tubular part 31D are housed in the main body tubular part 31D similarly to the first embodiment, and the supply voltage to the respective parts is supplied from the primary cell 10BT incorporated in the main body tubular part 31D. Therefore, the electrodes 2*d* and 2*e* for charging do not need to be disposed on the pen casing 2D of the electronic pen 1 using the electronic pen main unit 3D of this embodiment.

In this example, the main body tubular part 31D of the electronic pen main unit 3D of this embodiment is formed of a metal pipe. In addition, on the rear end part thereof on the side opposite to the pen tip side, a component 31DE in which a connector plug 50B' as an example of the rear-end-part connector is formed on a resin base 31Da is mounted attachably and detachably. In the electronic pen main unit 3D of this embodiment, the configuration is made in such a manner that the primary cell 10BT housed in the main body tubular part 31D can be replaced through removal of the component 31DE.

The casing of the electronic pen that houses the electronic pen main unit 3D of this embodiment is set to a diameter larger than that of the casing 2 of the electronic pen of the above-described first embodiment. The other configuration of the casing of the electronic pen is made similar to the above-described embodiment and includes a movement mechanism such as a knock cam mechanism or knock mechanism. At a fitting part moved by the movement mechanism, a connector jack to which the connector plug 50B' of the rear end part of the electronic pen main unit 3D is joined and that is electrically connected to a side switch and the conductor band 2*f* is disposed.

Also in a case in which the main body tubular part 31D is configured into a thick shape as in the electronic pen main unit 3D of this embodiment, a secondary cell or a power storage element such as a capacitor may be disposed instead of disposing the primary cell 10BT in the hollow part of the main body tubular part 31D. In this case, the configuration of the rear-end-part connector of the main body tubular part 31D of the electronic pen main unit 3D is configured similarly to the electronic pen main unit or the electronic pen main unit 3B of the first embodiment, and the electrodes 2*d* and 2*e* for charging are disposed on the casing 2 of the electronic pen.

Also in the electronic pen using the electronic pen main unit 3D of this example of FIG. 10B, the operation and effects similar to the electronic pen 1 of the first embodiment can be obtained. At the time of use, the core body 35, the front cap 34, and a part of the tapered part of the peripheral electrode 33 on the pen tip side protrude to the external from an opening of a casing 2D of the electronic pen illustrated by dotted lines in FIG. 10B.

FIG. 10C is a modification example of the electronic pen main unit 3C of FIG. 10A. A peripheral electrode 33C' of an electronic pen main unit 3C' of this example of FIG. 10C is different from the peripheral electrode 33C of the electronic pen main unit 3 of the example of FIG. 10A in that the pen tip side is made into a tapered part 33C'*b*. Specifically, the peripheral electrode 33C' of the electronic pen main unit 3C' of this example is made into a shape in which the tapered part 33C'*b* is formed on the pen tip side of a cylindrical shape part 33C' *a* whose outer diameter is set to the diameter R1 smaller than the diameter R0 of the opening 2*b* (see FIGS. 1A and 1B) of the pen casing 2 of the electronic pen. In this example, a front cap 34C' is disposed on the tip part of the tapered part 33C'*b* of the peripheral electrode 33C'. The others are configured similarly to the electronic pen main unit 3C of the example of FIG. 10A.

Also in a case of the electronic pen main unit 3C' of this example of FIG. 10C, at the time of use, the core body 35, the front cap 34C', and a part of the peripheral electrode 33C' on the pen tip side protrude to the external from the opening of the casing 2C of the electronic pen. In this case, the part of the peripheral electrode 33C' that protrudes to the external includes not only the tapered part 33C'*b* but also a part of the cylindrical shape part 33C' a, and the part located at the opening of the casing 2C is the cylindrical shape part 33C' a. Therefore, the operation and effects similar to the example of FIG. 10A are provided.

Other Embodiments of Electronic Pen

Several of other configuration examples of the electronic pen including fitting the rear-end-part connector included in the electronic pen main unit to the fitting part that is movable in the casing by the movement mechanism and includes the connector for joining as described above will be described with reference to schematic configuration examples illustrated in FIGS. 11A, 11B, and 11C.

Figure 11A:
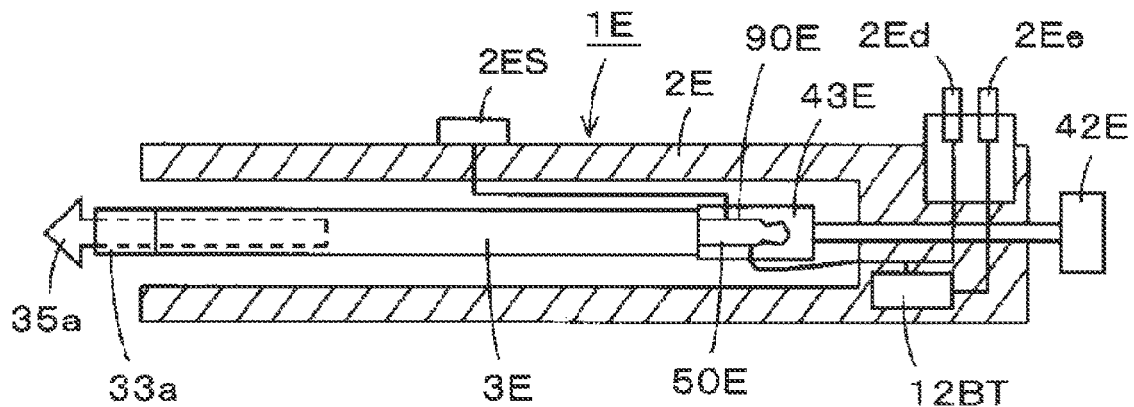
FIGS. 11A, 11B, and 11C depict diagrams for explaining configuration examples of other embodiments of the electronic pen according to an embodiment disclosed herein.

An electronic pen main unit 3E housed in an electronic pen 1E illustrated in FIG. 11A is different from the electronic pen main units of the above-described embodiments in that a supply voltage is obtained from a secondary cell (rechargeable battery) 12BT disposed in a casing 2E, and the others are made into a similar configuration.

In the electronic pen casing 2E of this example, a connector 90E for joining is disposed at a fitting part 43E moved by a knock bar 42E. In this connector 90E for joining, a terminal for supplying the supply voltage from the secondary cell 12BT to an electronic circuit inside the electronic pen main unit 3E and, in this example, a terminal to which a side switch 2ES is connected, are disposed. The conductor band 2*f* may be disposed on the pen casing 2E, and a terminal for connecting the conductor band 2*f* and an earth electrode of the electronic pen main unit 3E may be disposed.

When a rear-end-part connector 50E of the electronic pen main unit 3E is fitted to the fitting part 43E as illustrated in FIG. 11A, the rear-end-part connector 50E is joined to the connector 90E for joining disposed at the fitting part 43E, and the supply voltage from the secondary cell 12BT is supplied to the electronic circuit of the electronic pen main unit 3E. In addition, the side switch 2ES is connected to the electronic circuit, and the state thereof is allowed to be detected.

In this example, the secondary cell 12BT is configured to be charged from the external through electrodes 2Ed and 2Ee for charging.

According to this example, a power supply does not need to be disposed in the main body tubular part of the electronic pen main unit 3E, and therefore the configuration of the electronic pen main unit 3E can be simplified.

Because the secondary cell 12BT is used in the example of FIG. 11A, the electrodes 2Ed and 2Ee for charging are disposed on the pen casing 2E. However, a primary cell may be used instead of the secondary cell 12BT. In this case, the electrodes 2Ed and 2Ee for charging become unnecessary.

Figure 11B:
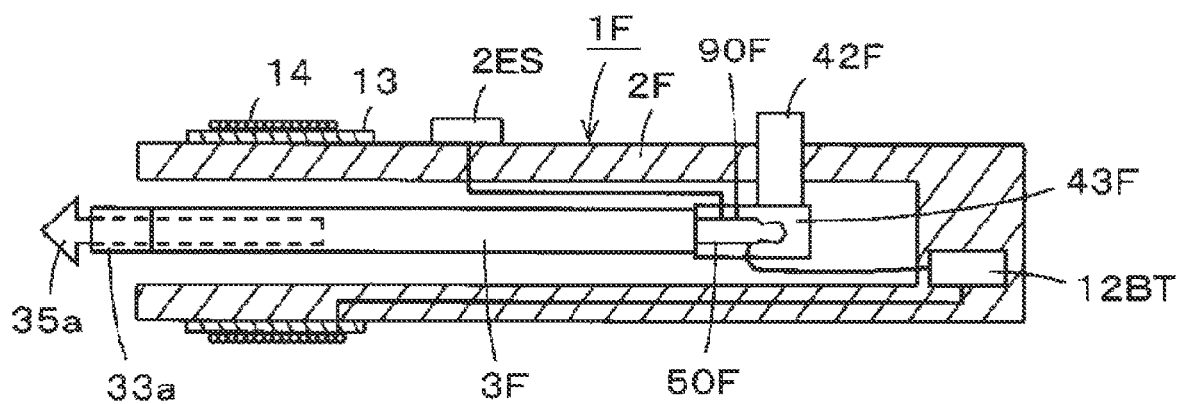

Next, FIG. 11B is a modification example of the electronic pen 1E of the example of FIG. 11A. In an electronic pen 1F of this example of FIG. 11B, the charging method of the secondary cell 12BT disposed in a pen casing 2F is different from the electronic pen 1E, and the other configuration is similar to the electronic pen 1E.

In the electronic pen 1F of this example, as illustrated in FIG. 11B, a core 13 is fitted and attached to the outer circumferential side surface of the pen casing 2F, and a coil 14 for charging is wound and disposed around this core 13.

Furthermore, in the electronic pen 1F of this example, a configuration in which electromagnetic energy supplied from the external is received by the coil 14 for charging and the secondary cell 12BT is charged is made.

In the electronic pen 1F of this example, a movement mechanism has a configuration using a knock bar 42F of a slide system. A connector 90F for joining is formed at a fitting part 43F moved in response to slide movement of this knock bar 42F and is configured to be joined to a rear-end-part connector 50F of an electronic pen main unit 3F. Also in the electronic pen 1F of this example, a movement mechanism based on a knock bar pushed from the rear end side of the pen casing 2F like that illustrated in FIG. 11A may be used. Furthermore, also in the electronic pen 1E of the example of FIG. 11A, it is also possible to make the configuration in such a manner that a movement mechanism using a knock bar of a slide system like that in FIG. 11B is used. In addition, in the example of FIG. 11B, the secondary cell 12BT is disposed in the casing 2F of the electronic pen 1F. However, the configuration may be made in such a manner that a secondary cell is disposed in the electronic pen main unit 3F and is charged by a charging current from the charging coil 14.

Figure 11C:
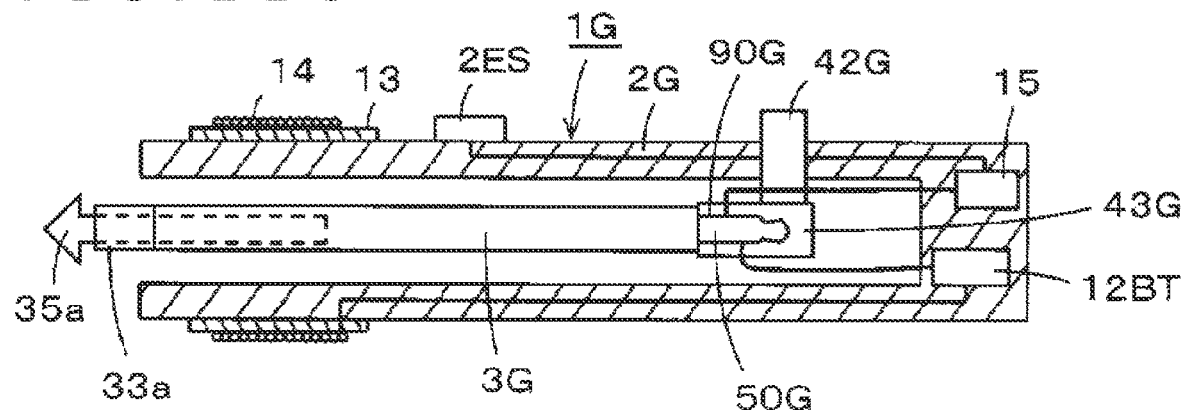

Moreover, an electronic pen 1G of an example of FIG. 11C is different from the electronic pen 1F of the example of FIG. 11B in that an electronic circuit 15 is disposed in a pen casing 2G and the side switch 2S is connected to the electronic circuit 15 through not a connector for joining but, for example, a flexible cable, and the others are made into a similar configuration. Furthermore, in the electronic pen 1G of this example, a connector 90G for joining and a rear-end-part connector 50G of an electronic pen main unit 3G are joined, and the electronic pen main unit 3G and electronic circuit components disposed on the pen casing 2G are electrically connected through a flexible cable or the like.

In the electronic pen 1G of this example, a voltage from the secondary cell 12BT disposed in the pen casing 2G is supplied to an electronic circuit of the electronic pen main unit 3G as a supply voltage similarly to the electronic pens 1E and 1F of the above-described examples. In addition, in the electronic pen 1G of this example, the voltage from the secondary cell 12BT is supplied to the electronic circuit 15 as a supply voltage.

In this electronic circuit 15, a control part formed of an IC is disposed and a wireless communication part that carries out wireless communication of, for example, the Bluetooth (registered trademark) standard is disposed to be connected to the control part. This wireless communication part is what is for carrying out wireless communication between the electronic pen 1G and a position detecting device of a capacitive coupling system similarly to the above-described embodiments. Furthermore, the control part of the electronic circuit 15 is connected to a terminal part including a circular annular conductor contact part of the connector 90G for joining.

In addition, in the electronic pen 1G of this example, the side switch 2S is connected to the control part, and the configuration is made in such a manner that operation information of this side switch 2S is wirelessly transmitted to the position detecting device of the capacitive coupling system.

Moreover, in the electronic pen 1G of the example of FIG. 11C, the electronic circuit 15 disposed in the pen casing 2G is configured to acquire writing pressure information detected by the electronic circuit of the electronic pen main unit 3G through the rear-end-part connector 50G and the connector 90G for joining and wirelessly transmit the writing pressure information to the position detecting device of the capacitive coupling system. Therefore, the writing pressure information does not need to be included in a signal for position detection sent out from the core body 35 of the electronic pen main unit 3G of this example. Also in the electronic pen 1G of this example, the writing pressure information may be included in the signal for position detection sent out from the core body 35 of the electronic pen main unit 3G and be sent out.

Also in the electronic pen 1G of this example, a movement mechanism based on a knock bar pushed from the rear end side of the pen casing 2F like that illustrated in FIG. 11A may be used.

Furthermore, in the configuration of the electronic pen 1G of this example of FIG. 11C, it is also possible to make the configuration as follows by using the electronic circuit 15.

Specifically, a memory that stores identification information (pen ID) of the electronic pen 1G may be disposed to be connected to the control part of the electronic circuit 15, and a position detecting device may be notified of the pen ID through the wireless communication part.

Furthermore, a memory that stores identification information (pen main unit ID) of the electronic pen main unit 3G is disposed in the electronic circuit of the electronic pen main unit 3G, and the pen main unit ID in this memory is supplied to the electronic circuit 15 disposed in the pen casing 2G through the rear-end-part connector 50G and the connector 90G for joining. Then, this electronic circuit 15 may notify the pen main unit ID to the position detecting device through the wireless communication part.

Moreover, in the electronic circuit of the electronic pen main unit 3G, a signal sent out from a position detecting sensor of the position detecting device is received by the peripheral electrode 33, and the signal level of the signal received by a receiving part thereof is detected. Then, it is detected whether the electronic pen 1G is in an in-range state in which the electronic pen 1G makes capacitive coupling with the position detecting sensor or an out-range state in which the electronic pen 1G is not coupled with the position detecting sensor, and a detection signal thereof is supplied to the electronic circuit 15 disposed in the pen casing 2G through the rear-end-part connector 50G and the connector 90G for joining. Then, this electronic circuit 15 may notify whether the electronic pen 1G is in the in-range state or the out-range state to the position detecting device through the wireless communication part.

OTHER EMBODIMENTS OR MODIFICATION EXAMPLES

In the above-described embodiments, the peripheral electrode is composed of a tubular conductor. However, the peripheral electrode may be what is configured into a tubular shape by a conductor divided into multiple pieces in the circumferential direction.

Furthermore, the core body 35 is composed of an electrically-conductive metal. However, it is sufficient for the core body 35 to be what has electrical conductivity. Therefore, the core body 35 may include a hard resin into which conductor powders are mixed, for example.

The main body tubular part of the electronic pen main unit may include a single body of a resin pipe instead of the configuration in which the metal pipe part and the resin pipe part are joined. Moreover, the rear end side of the main body tubular part does not need to have the pipe shape, and it is sufficient that the rear end side can be made into a structure including a connector by a resin material.

DESCRIPTION OF REFERENCE SYMBOLS

1: Electronic pen
2: Casing of an electronic pen
3: Electronic pen main unit
4: Knock cam mechanism unit
7: Core body holding component
8: Writing pressure detecting unit
9: Printed board
10: Capacitor for power storage
12BT: Secondary cell
30: Casing of an electronic pen main unit
31: Main body tubular part
32: Tubular joining component
33: Peripheral electrode
34: Front cap
35: Center electrode (core body)

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An electronic pen main unit that is configured as a replaceable cartridge to be fitted to a fitting part positioned in a casing of an electronic pen in which a pen tip side that is one end side of the electronic pen in an axial center direction includes an opening, and configured to be housed in a state of being movable in a hollow part of the casing by a movement mechanism that moves the fitting part in the axial center direction, the electronic pen main unit comprising:
 a pen tip part including an electrically-conductive core body configured to protrude externally from the casing through the opening by being moved by the movement mechanism;
 a main body tubular part to which the pen tip part is joined on the pen tip side in the axial center direction, the main body tubular part housing an electronic circuit including a signal generating circuit configured to generate a signal to be transmitted by the core body; and
 a rear-end-part connector that is positioned at a rear end part of the main body tubular part on a side opposite from the pen tip part in the axial center direction, includes a plurality of annular terminals arranged at a plurality of different locations along the axial center direction of the replaceable cartridge and electrically insulated from each other and electrically connected to the electronic circuit, and is configured to be joined to a joining connector positioned at the fitting part, wherein the joining connector includes a plurality of contact terminals,
 wherein the plurality of annular terminals are configured to be electrically coupled to the plurality of contact terminals when the replaceable cartridge is received in the casing and the rear-end-part connector is joined to the joining connector, and at least one of the plurality of annular terminals is a power-supply annular terminal configured to be electrically coupled to one of the contact terminals to supply power from a power source to the electronic circuit of the replaceable cartridge.

2. The electronic pen main unit according to claim 1, wherein
 the plurality of annular terminals are electrically insulated from each other, and
 the rear-end-part connector and the joining connector are configured to be joined through insertion of a fitting protrusion of one of the rear-end-part connector or the joining connector into a fitting recess of the other of the rear-end-part connector or the joining connector in the axial center direction.

3. The electronic pen main unit according to claim 2, wherein
 the rear-end-part connector includes the fitting protrusion, and
 the plurality of annular terminals include circular annular conductor contact parts having center positions that are aligned with each other in the axial center direction.

4. The electronic pen main unit according to claim 2, wherein
 the joining connector includes the fitting protrusion,
 the plurality of contact terminals of the joining connector include circular annular conductor contact parts having center positions that are aligned with each other and are at different positions in the axial center direction, and
 the plurality of annular terminals of the rear-end-part connector are configured to contact the circular annular conductor contact parts of the plurality of contact terminals of the joining connector.

5. The electronic pen main unit according to claim 1, wherein
 the pen tip part includes:
  a center electrode having one end side in the axial center direction that becomes a pen tip and that configures the core body, and
  a peripheral electrode that is positioned around the center electrode except at least around the pen tip, and is electrically insulated from the center electrode.

6. The electronic pen main unit according to claim 5, wherein, in a case where the one end side that becomes the pen tip in the center electrode protrudes externally from the casing through the opening, a part of the peripheral electrode on the pen tip side protrudes externally from the casing through the opening.

7. The electronic pen main unit according to claim 1, wherein
 a power storage element is positioned in the main body tubular part, the power storage element configured to supply a supply voltage to the electronic circuit, and
 the power-supply annular terminal is configured to supply a charging current sent through the joining connector to the power storage element.

8. The electronic pen main unit according to claim 1, wherein
 the power source is a battery which is positioned in the casing and outside the electronic pen main unit, and
 the power-supply annular terminal is configured to receive a voltage of the battery as a supply voltage of the electronic circuit.

9. The electronic pen main unit according to claim 1, wherein
 another electronic circuit is positioned in the hollow part of the casing, and
the plurality of annular terminals of the rear-end-part connector include an annular terminal configured to electrically connect the electronic circuit and the another electronic circuit to each other.

10. The electronic pen main unit according to claim 1, wherein
the plurality of annular terminals of the rear-end-part connector include an annular terminal electrically connected to a side switch positioned on the casing in such a manner as to be operable by a user.

11. The electronic pen main unit according to claim 1, wherein the rear-end-part connector is one of a connector plug or a connector jack, and the joining connector is the other of the connector plug or the connector jack.

12. An electronic pen, comprising:
a tubular casing including an opening at one end side of the electronic pen in an axial center direction that is a pen tip side;
a fitting part including a joining connector having a plurality of contact terminals;
a movement mechanism configured to move the fitting part in the axial center direction; and
an electronic pen main unit configured as a replaceable cartridge in the tubular casing, a rear end part side of the electronic pen main unit on a side opposite from the pen tip side being coupled to the fitting part, the electronic pen main unit including:
 a pen tip part including an electrically-conductive core body configured to protrude externally from the tubular casing through the opening through movement of the fitting part by the movement mechanism;
 a main body tubular part to which the pen tip part is joined on the pen tip side in the axial center direction, the main body tubular part housing an electronic circuit including a signal generating circuit configured to generate a signal to be transmitted by the core body, and
 a rear-end-part connector that is positioned at a rear end part of the main body tubular part on a side opposite from the pen tip part in the axial center direction, includes a plurality of annular terminals arranged at a plurality of different locations along the axial center direction of the replaceable cartridge and electrically insulated from each other and electrically connected to the electronic circuit, and is configured to be joined to the joining connector,
 wherein the plurality of annular terminals are configured to be electrically coupled to the plurality of contact terminals when the replaceable cartridge is received in the tubular casing and the rear-end-part connector is joined to the joining connector, and at least one of the plurality of annular terminals is a power-supply annular terminal configured to be electrically coupled to one of the contact terminals to supply power from a power source to the electronic circuit of the replaceable cartridge.

13. The electronic pen according to claim 12, wherein:
the power source is a charging electrode positioned on the tubular casing; and
the electronic pen further comprises a power storage element positioned in the main body tubular part, the power storage element configured to supply a supply voltage to the electronic circuit, wherein
the charging electrode is electrically connected to a first contact terminal part of the joining connector, the power-supply annular terminal is electrically connected to the electronic circuit in such a manner as to supply a charging current to the power storage element, and
the first contact terminal and the power-supply terminal are electrically connected in a case where the rear-end-part connector is joined to the joining connector.

14. The electronic pen according to claim 12, wherein:
the power source is a charging coil mounted on the tubular casing, the charging coil configured to generate a current for charging by electromagnetic induction; and
the electronic pen further comprises a power storage element positioned in the main body tubular part, the power storage element configured to supply a supply voltage to the electronic circuit, wherein
the charging coil is electrically connected to a first contact terminal of the joining connector,
the power-supply annular terminal is electrically connected to the electronic circuit in such a manner as to supply a charging current to the power storage element, and
the first contact terminal and the power-supply annular terminal are electrically connected in a case where the rear-end-part connector is joined to the joining connector.

15. The electronic pen according to claim 12, wherein:
the power source is a battery positioned in the tubular casing,
the battery is electrically connected to a first contact terminal of the joining connector,
the power-supply annular terminal is electrically connected to a power supply path of the electronic circuit, and
the first contact terminal and the power-supply annular terminal are electrically connected in a case where the rear-end-part connector is joined to the joining connector.

16. The electronic pen according to claim 15, wherein the battery is a rechargeable battery, and a charging electrode positioned on the tubular casing is used when the battery is charged.

17. The electronic pen according to claim 12, further comprising:
a side switch positioned on the tubular casing in such a manner as to be operable by a user, wherein
the electronic circuit includes an information generating circuit configured to determine a state of the side switch and generate information for transmitting the state of the side switch to a position detecting device,
the side switch is electrically connected to a first contact terminal of the joining connector,
the rear-end-part connector includes a second annular terminal electrically connected to the information generating circuit, and
the first contact terminal and the second annular terminal are electrically connected in a case where the rear-end-part connector is joined to the joining connector.

18. The electronic pen according to claim 12, further comprising:
a wireless communication part positioned in the tubular casing, the wireless communication part configured to carry out wireless communication with a position detecting device, wherein
a writing pressure detecting unit configured to detect a writing pressure applied to a pen tip of the electronic pen main unit or an identification information generating part configured to generate identification information of the electronic pen main unit is included in the electronic pen main unit, and information regarding the writing pressure detected by the writing pressure detecting unit or the identification information generated by the identification information generating part is supplied to the wireless communication part through the rear-end-part connector and the joining connector and is transmitted through the wireless communication part.

19. The electronic pen according to claim 12, wherein the movement mechanism includes a knock mechanism of a knock-type ballpoint pen.

20. The electronic pen according to claim 12, wherein the movement mechanism includes a mechanism of a knock-type multi-color ballpoint pen configured to selectively move one fitting part of a plurality of fitting parts, and at least one of the plurality of fitting parts is the fitting part including the joining connector.

* * * * *